(12) United States Patent
Murthy et al.

(10) Patent No.: US 11,458,634 B2
(45) Date of Patent: Oct. 4, 2022

(54) MODULAR FURNITURE INSTALLMENT CONFIGURATION

(71) Applicant: Bumblebee Spaces Inc., San Francisco, CA (US)

(72) Inventors: Sankarshan Narasimha Murthy, Mountain View, CA (US); Prahlad Athreya, San Ramon, CA (US); Jaideep Singh Chavan, Sunnyvale, CA (US); Rico Zorkendorfer, Jackson Hole, WY (US); Scott Tandoi, San Francisco, CA (US); Aaron Licata, San Ramon, CA (US)

(73) Assignee: Bumblebee Spaces Inc., San Francisco, CA (US)

( * ) Notice: Subject to any disclaimer, the term of this patent is extended or adjusted under 35 U.S.C. 154(b) by 230 days.

(21) Appl. No.: 16/888,428

(22) Filed: May 29, 2020

(65) Prior Publication Data
US 2021/0370515 A1    Dec. 2, 2021

(51) Int. Cl.
| B25J 5/02 | (2006.01) |
| B25J 9/16 | (2006.01) |
| B25J 19/00 | (2006.01) |
| B25J 19/02 | (2006.01) |
| B25J 19/06 | (2006.01) |
| B25J 13/08 | (2006.01) |
| B65G 43/00 | (2006.01) |

(52) U.S. Cl.
CPC ............... B25J 9/1694 (2013.01); B25J 5/02 (2013.01); B25J 9/161 (2013.01); B25J 9/1674 (2013.01); B25J 9/1692 (2013.01); B25J 13/087 (2013.01); B25J 19/0025 (2013.01); B25J 19/02 (2013.01); B25J 19/061 (2013.01); B65G 43/00 (2013.01)

(58) Field of Classification Search
CPC .......... B25J 5/02; B25J 9/1692; A47F 5/0846; G05B 2219/40252
USPC ............... 414/594; 211/94.01; 248/342, 343; 312/334.1, 334.7
See application file for complete search history.

(56) References Cited

U.S. PATENT DOCUMENTS

| 5,472,269 | A | * | 12/1995 | Novikoff | A47B 21/00 312/265.5 |
| 6,047,838 | A | * | 4/2000 | Rindoks | A47B 96/1458 211/187 |
| 2019/0360259 | A1 | * | 11/2019 | Green | E05G 1/08 |
| 2020/0232205 | A1 | * | 7/2020 | Richmond | E04B 1/34823 |
| 2020/0268160 | A1 | * | 8/2020 | Kuhl | A47C 13/005 |
| 2021/0007507 | A1 | * | 1/2021 | Furuland | A47B 85/04 |

* cited by examiner

*Primary Examiner* — Dalena Tran
(74) *Attorney, Agent, or Firm* — Fenwick & West LLP

(57) ABSTRACT

Systems and methods for ease of installation of modular furniture are disclosed herein. Various embodiments include a method comprising: receiving a ceiling scan; mounting a rails system based on the ceiling scan; installing robots for machine control of the modular furniture using the rails system; and positioning the modular furniture using a positioning control system electrically connected to the robots.

20 Claims, 28 Drawing Sheets

MODULAR FURNITURE INSTALLMENT CONFIGURATION

FIELD OF TECHNOLOGY

Embodiments of the present disclosure are directed to systems and methods for ease of installation of modular furniture, and more particularly, for efficient use of space by modular furniture.

SUMMARY

In some embodiments the present disclosure is directed to a system of one or more computers which can be configured to perform particular operations or actions by virtue of having software, firmware, hardware, or a combination thereof installed on the system that in operation causes or cause the system to perform actions and/or method steps as described herein.

According to some embodiments, the present technology is directed to systems and methods for ease of installation of modular furniture. An exemplary method includes: receiving a ceiling scan; mounting a rails system based on the ceiling scan; installing robots for machine control of the modular furniture using the rails system; and positioning the modular furniture using a positioning control system electrically connected to the robots. Embodiments of the present disclosure allow for efficient use of space by modular furniture.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DESCRIPTION OF EXEMPLARY EMBODIMENTS

As urban density increases, the demand for housing with efficient utilization of space is increasing. Accordingly, there is a need for efficient utilization of space in urban housing. Embodiments of the present disclosure are directed to systems and methods for ease of installation of modular furniture.

Figure 1:
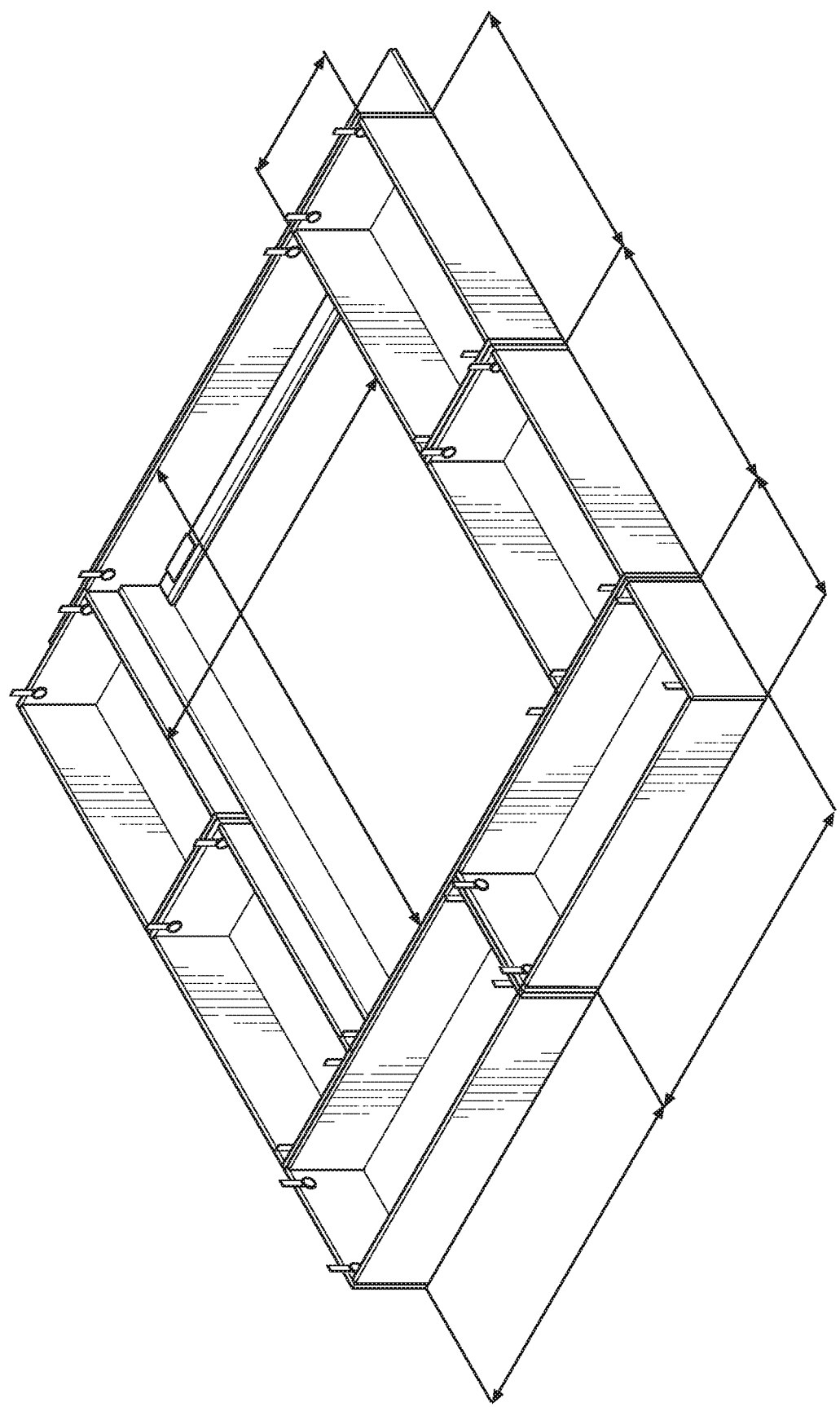
FIG. 1 is an axonometric drawing of exemplary module for ease of installation of modular furniture according to various embodiments of the present technology.

FIG. 1 is an axonometric drawing of exemplary module for ease of installation of modular furniture according to various embodiments of the present technology. FIG. 1 shows module specifications according to some embodiments.

Figure 2:
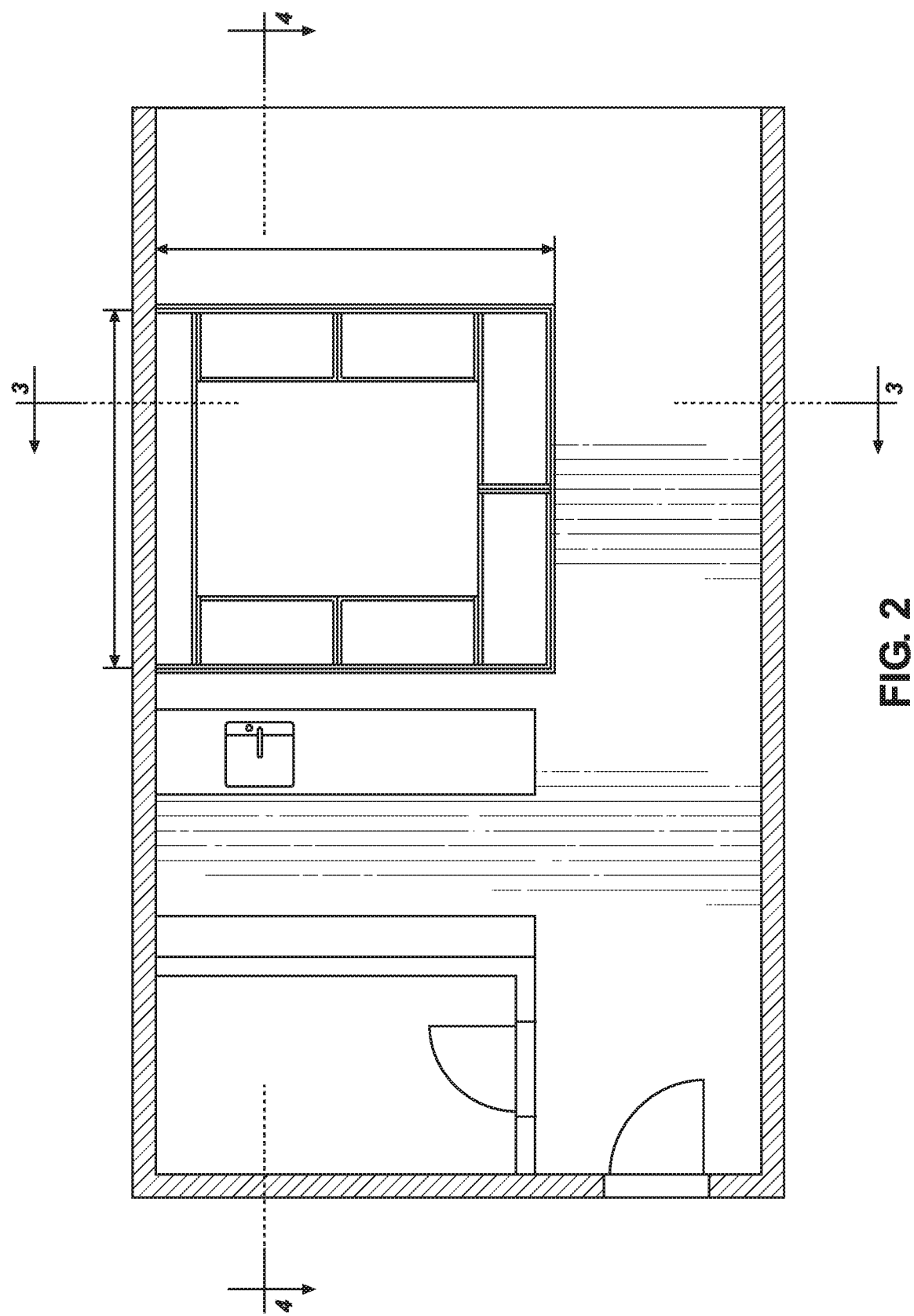
FIG. 2 is a drawing of a modular arrangement of a reflected ceiling plan for ease of installation of modular furniture according to various embodiments of the present technology.

FIG. 2 is a drawing of a modular arrangement of a reflected ceiling plan for ease of installation of modular furniture according to various embodiments of the present technology. FIG. 2 shows specifications of a reflected ceiling plan according to various embodiments.

Figure 3:
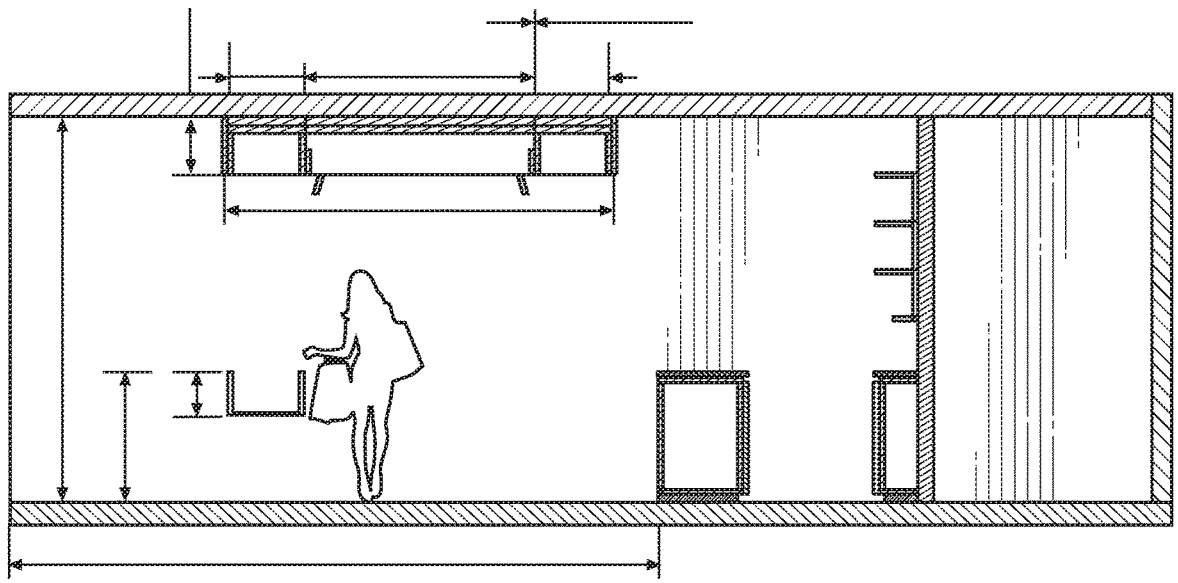
FIG. 3 is a drawing of storage access using the modular arrangement according to various embodiments of the present technology.

FIG. 3 is a drawing of storage access using the modular arrangement according to various embodiments of the present technology. FIG. 3 shows the modular furniture raised to the ceiling to allow extra space (i.e., access to storage) and the modular furniture can be lowered from the ceiling (as shown in FIG. 4) in some embodiments.

Figure 4:
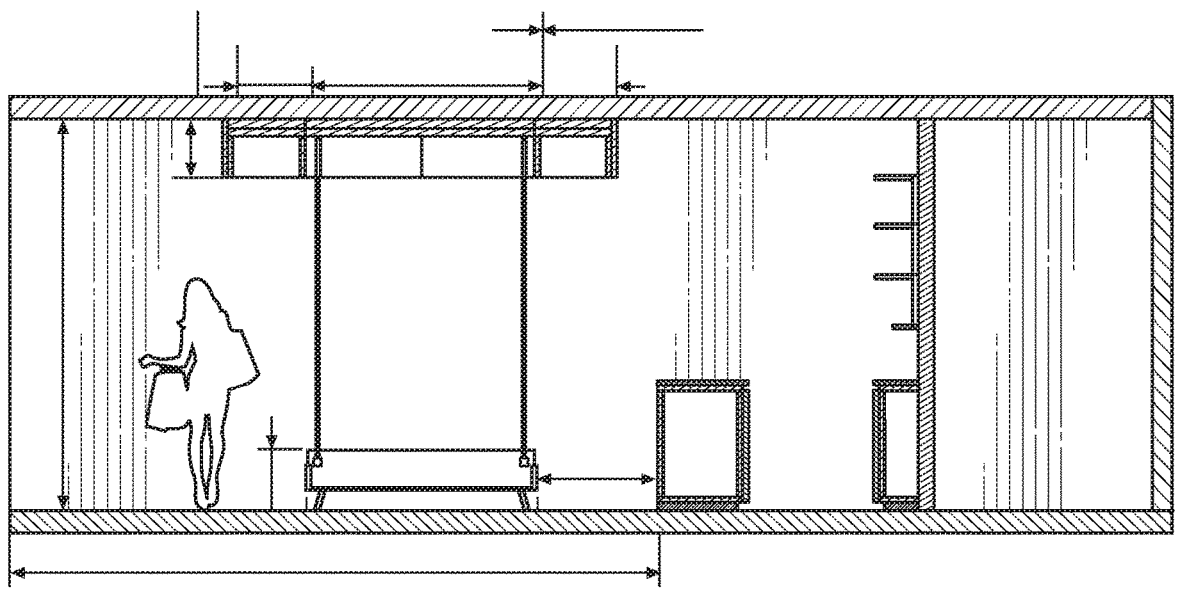
FIG. 4 is a drawing of bed access using the modular arrangement according to various embodiments of the present technology.

FIG. 4 is a drawing of bed access using the modular arrangement according to various embodiments of the present technology. FIG. 4 shows the modular furniture lowered from the ceiling to allow bed access in some embodiments. The modular furniture may be raised to the ceiling to allow extra space (i.e., access to storage) as shown in FIG. 3.

Figure 5:
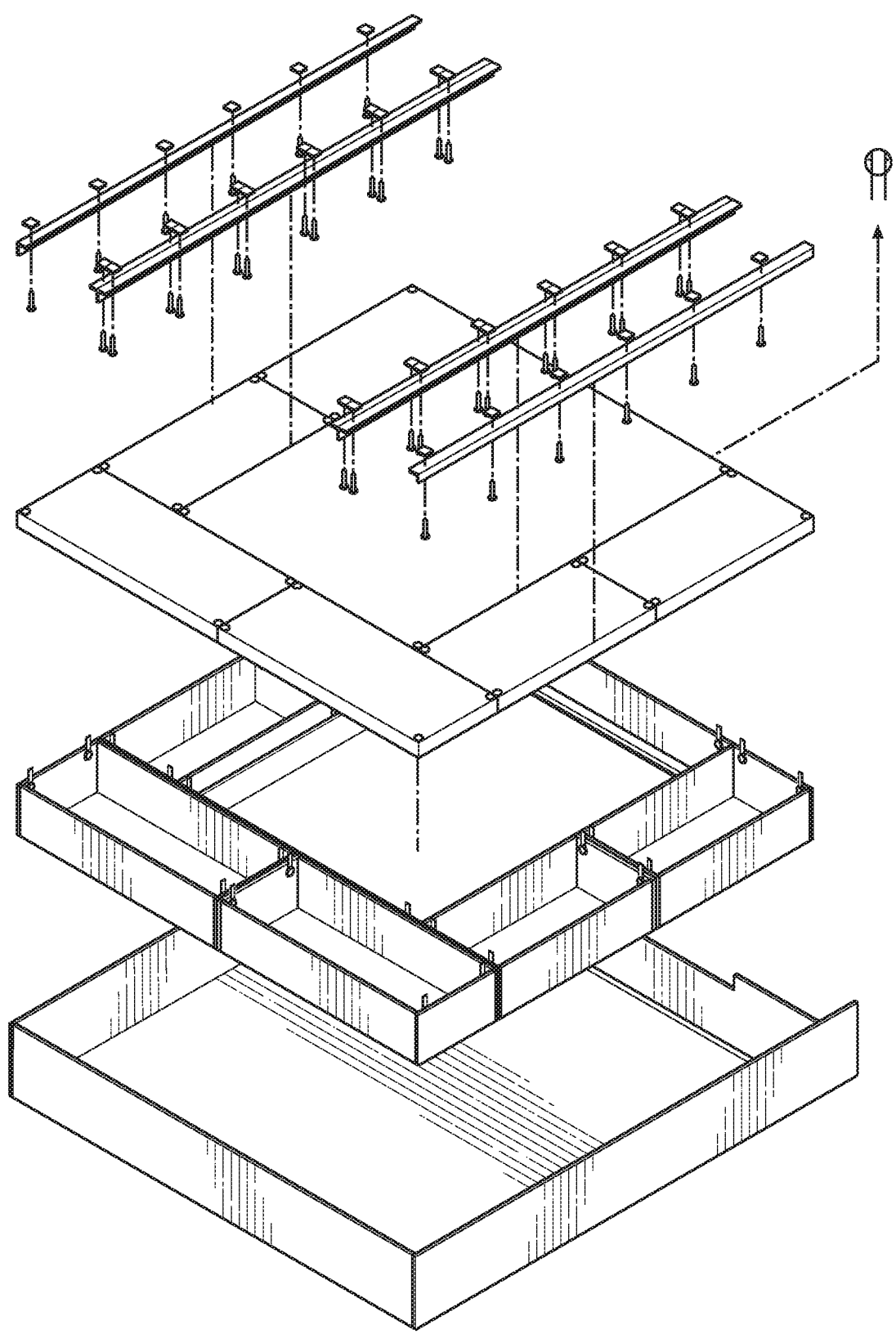
FIG. 5 is an illustration of exemplary installation components of the modular arrangement according to various embodiments of the present technology.

FIG. 5 is an illustration of exemplary installation components of the modular arrangement according to various embodiments of the present technology. FIG. 5 shows components used for the module furniture including rails, robots, furniture, and a frame used in some embodiments.

Figure 6:
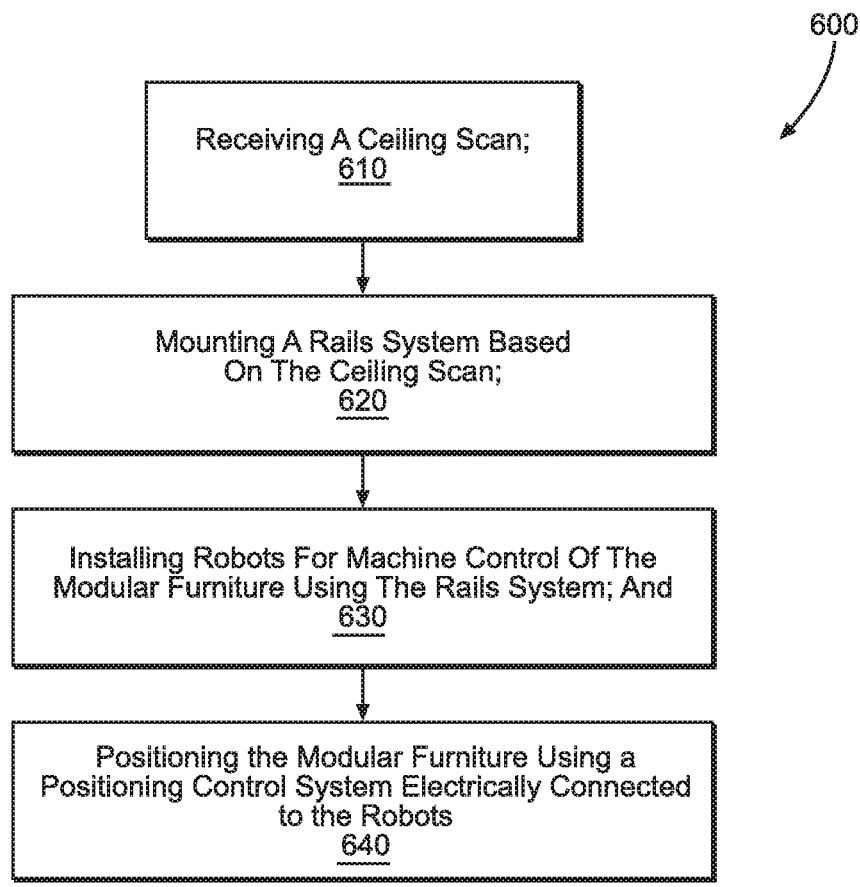
FIG. 6 is an exemplary method for ease of installation of modular furniture according to various embodiments of the present technology.

FIG. 6 is an exemplary method for ease of installation of modular furniture according to various embodiments of the present technology. The exemplary method 600 for ease of installation of modular furniture includes the following operations including receiving 610 a ceiling scan and mounting 620 a rails system based on the ceiling scan. The exemplary method 600 also includes installing 630 robots for machine control of the modular furniture using the rails system; and positioning 640 the modular furniture using a positioning control system electrically connected to the robots. In some embodiments the positioning 640 the modular furniture using a positioning control system electrically connected to the robots may include but is not limited to box levelness and depth from the ceiling. Moreover, the position control system may use sway detection data, thermal detection data, look down sensor data, and the like to position the modular furniture.

Figure 7:
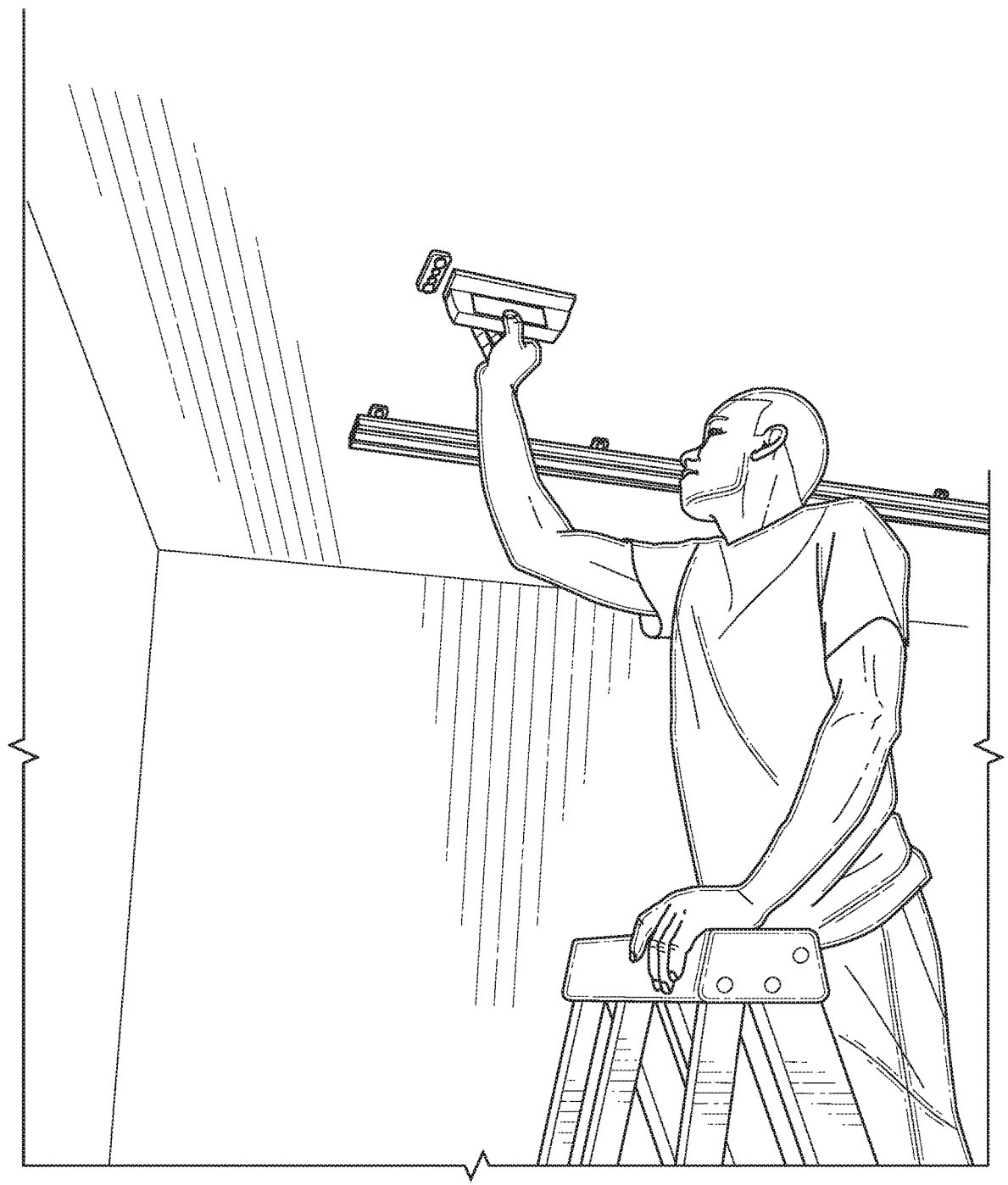
FIG. 7 is an exemplary picture of performing a ceiling scan according to various embodiments of the present technology.

FIG. 7 is an exemplary picture of performing a ceiling scan according to various embodiments of the present technology. An installation user may check for obstructions and drill locations in the ceiling while performing a ceiling scan.

FIG. 7 shows an installation user using a stud finder during a ceiling scan for a wooden ceiling installation according to various embodiments. In some instances, a ceiling scan map may be formed for a concrete ceiling installation using a Ground Penetrating Radar (GPR) scanner to understand location and depth of obstructions (e.g., Post Tension Cable, Rebar, electrical lines, and the like), and to define clear drill zones for installation.

Figure 8:
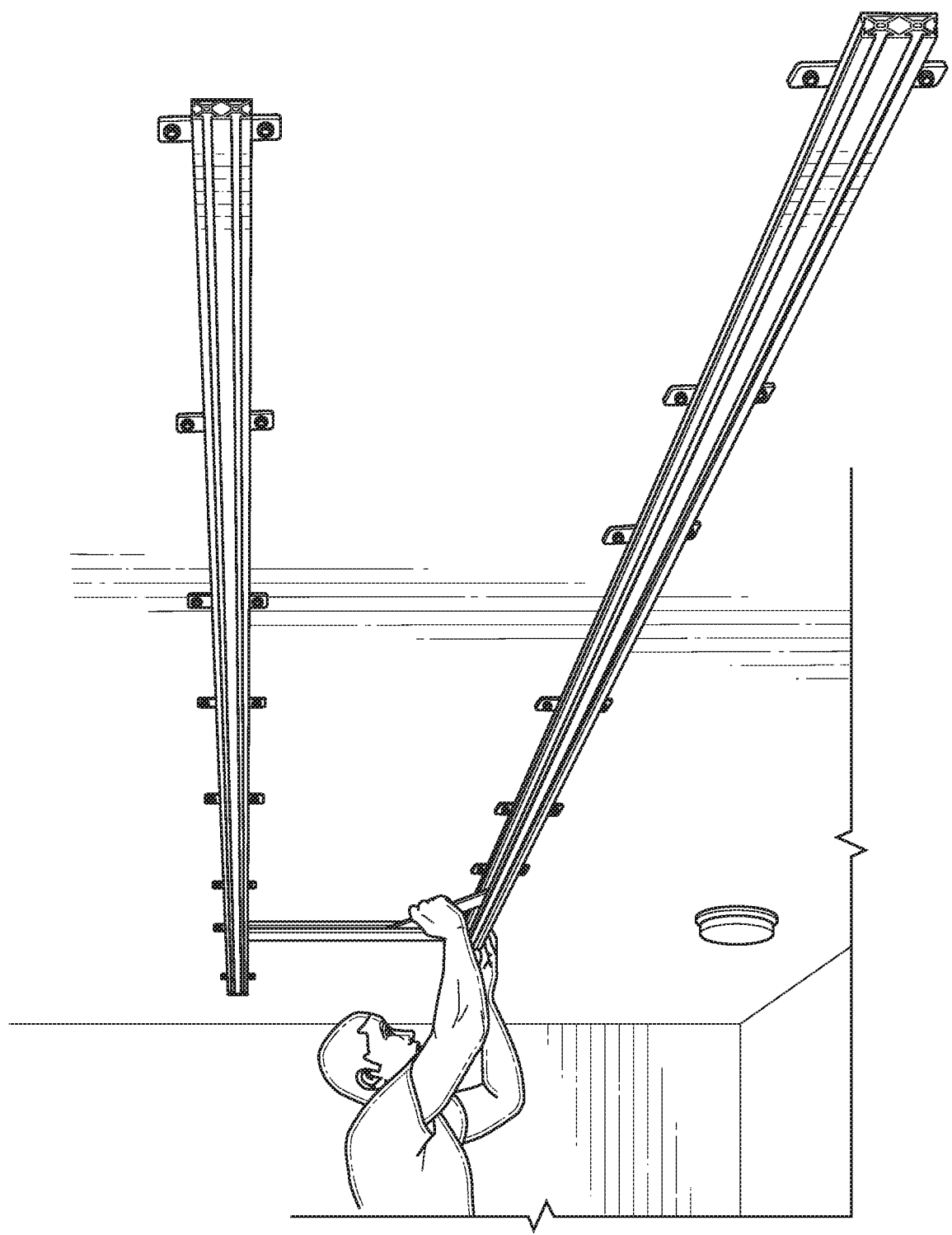
FIG. 8 is an exemplary picture of mounting a rails system based on the ceiling scan according to various embodiments of the present technology.

FIG. 8 is an exemplary picture of mounting a rails system based on the ceiling scan according to various embodiments of the present technology. FIG. 8 shows an installation user mounting a rails system according to some embodiments.

Figure 9:
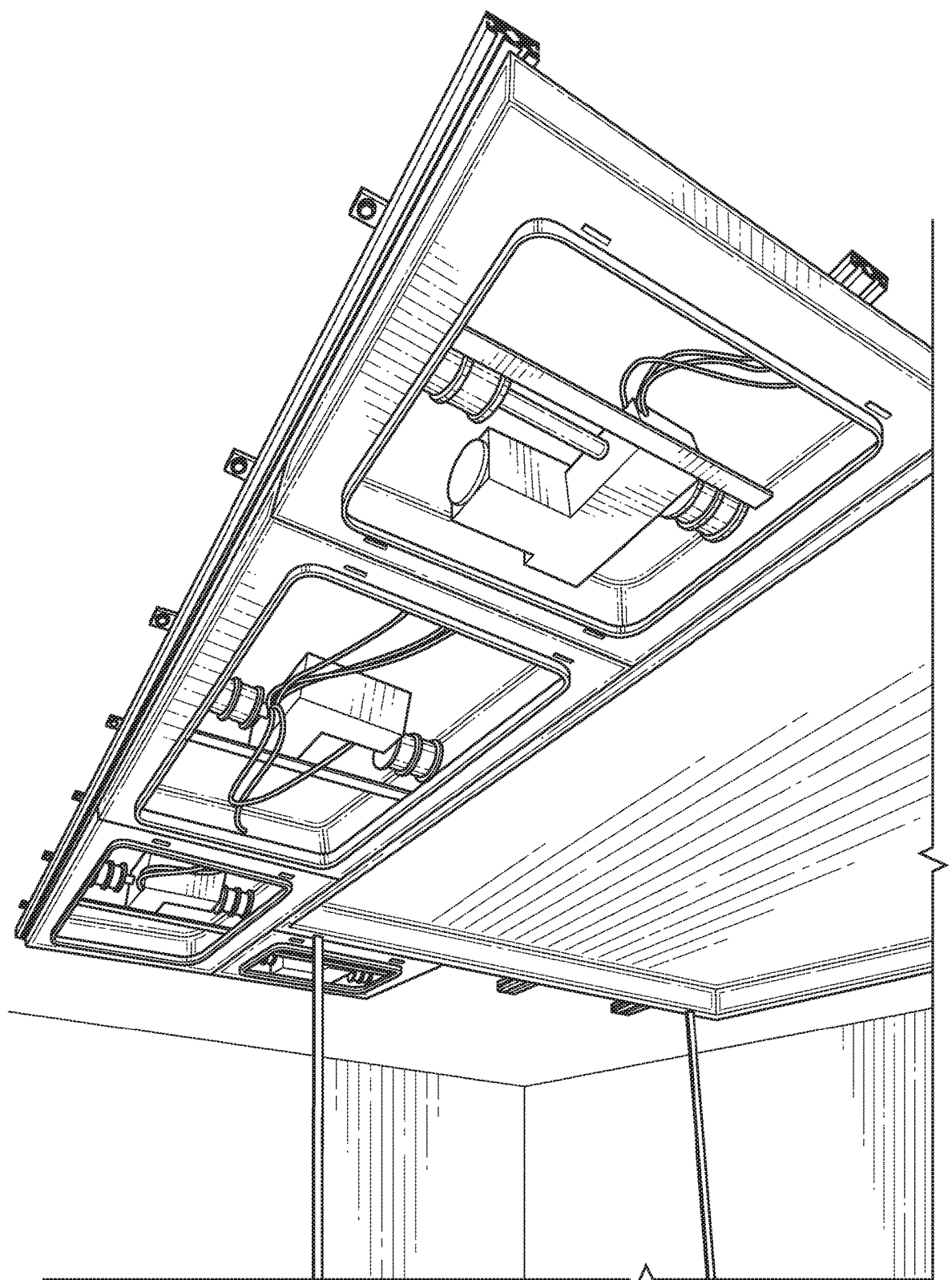
FIG. 9 is an exemplary picture of installing robots for machine control of the modular furniture using the rails system according to various embodiments of the present technology.

FIG. 9 is an exemplary picture of installing robots for machine control of the modular furniture using the rails system according to various embodiments of the present technology. FIG. 9 shows installed robots according to some embodiments.

Figure 10:
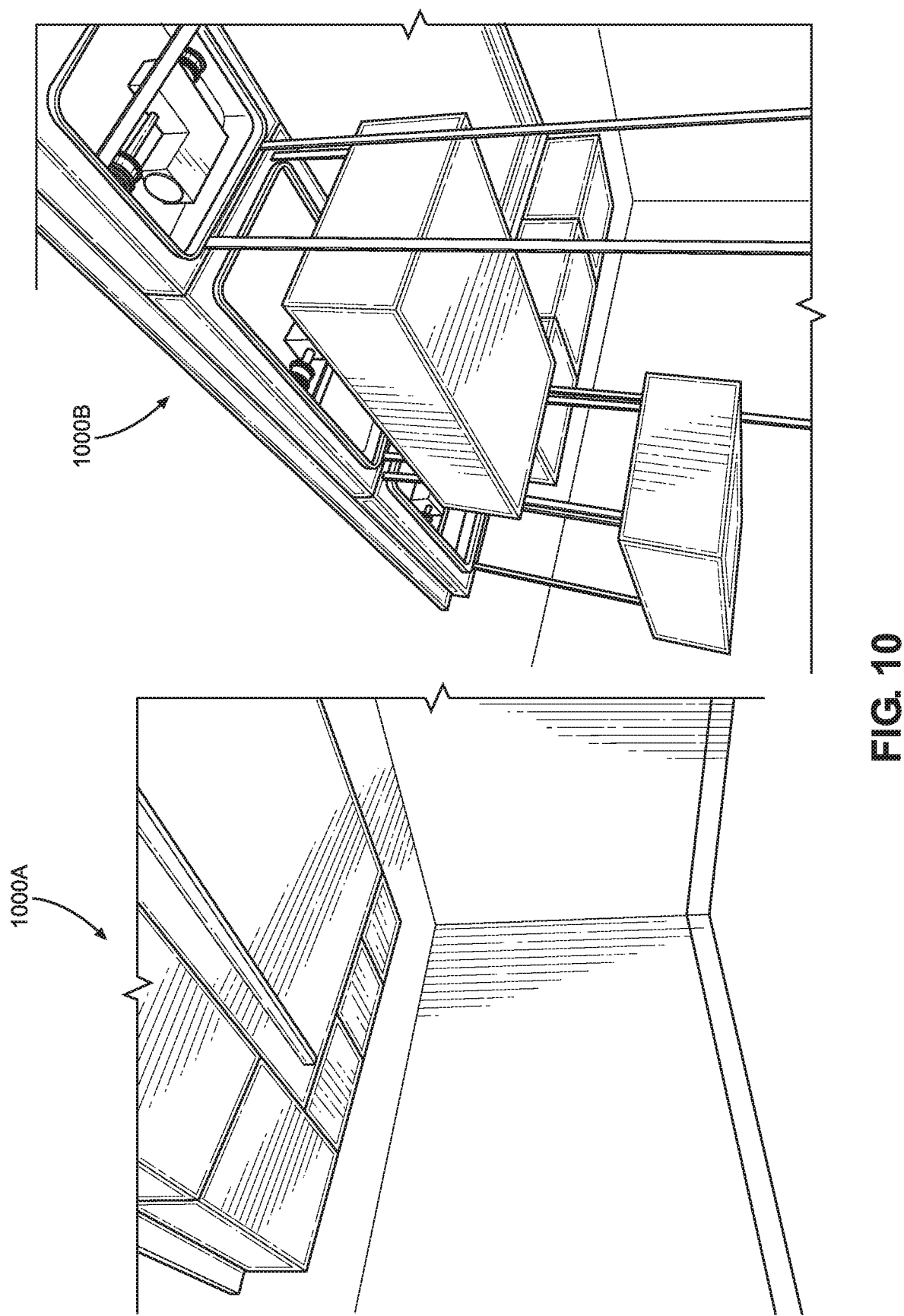
FIG. 10 is an exemplary picture of positioning the modular furniture using a positioning control system electrically connected to the robots according to various embodiments of the present technology.

FIG. 10 is an exemplary picture of positioning the modular furniture using a position control system electrically connected to the robots according to various embodiments of the present technology. FIG. 10 shows the modular furniture raised to the ceiling 1000A and the modular furniture lowered to various levels 1000B according to some embodiments. In some embodiments the positioning of the modular furniture using a position control system may include but is not limited to box levelness and depth from the ceiling. Moreover, the position control system may use sway detection data, thermal detection data, look down sensor data, and the like to position the modular furniture.

Figure 11:
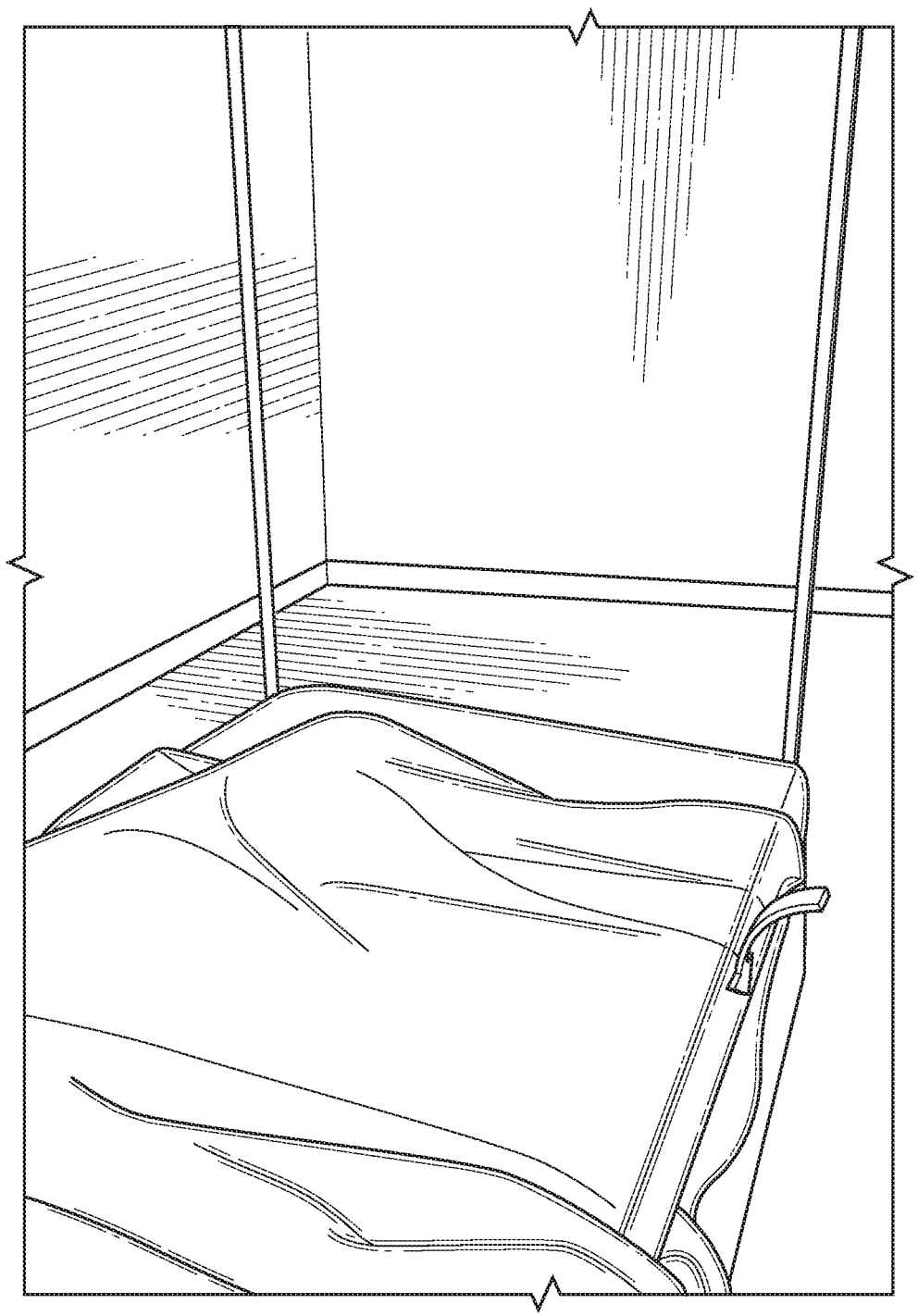
FIG. 11 is an exemplary picture of installing the modular furniture according to various embodiments of the present technology.

FIG. 11 is an exemplary picture of installing the modular furniture according to various embodiments of the present technology. FIG. 11 shows an exemplary bed to maximize the use of space according to various embodiments.

Figure 12:
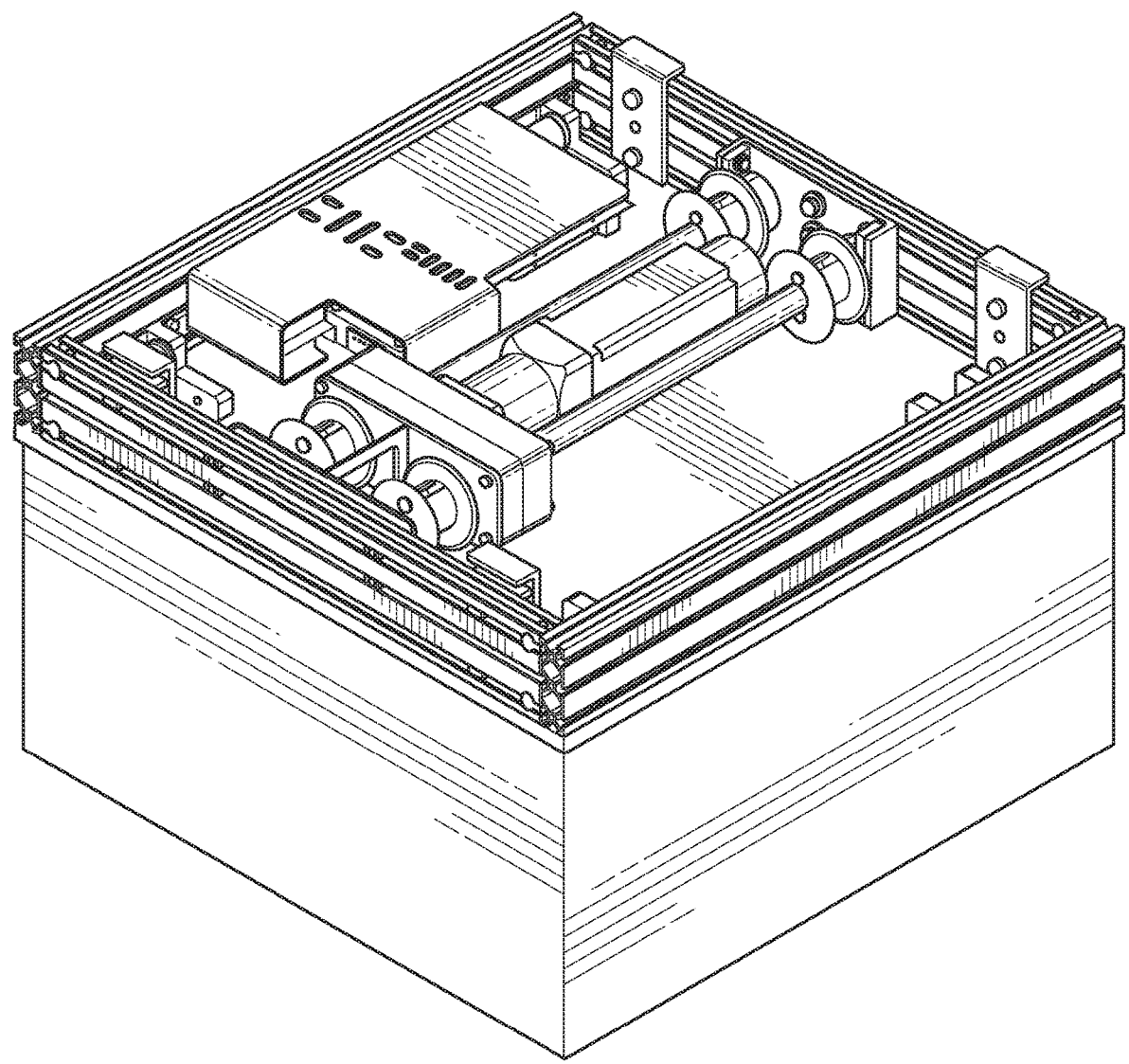
FIG. 12 illustrates an exemplary installation system for ease of installation of modular furniture according to various embodiments of the present technology.

FIG. 12 illustrates an exemplary installation system for ease of installation of modular furniture according to various embodiments of the present technology. In some embodiments the installation system enables installation of a secure robot into the ceiling with a high factor of safety, adapting to changing internal structure in concrete slab affecting drill locations, and accommodating errors in installation accuracy and location of ceiling rails. Furthermore, embodiments of the installation system allow reducing time to install/uninstall into the ceiling, increasing repeatability of the installation process and reducing operator fatigue and drilling/installing errors. Moreover, installation system enables the installation process to be modular and adaptive to various layouts without changes to jigs or fixtures.

Figure 13:
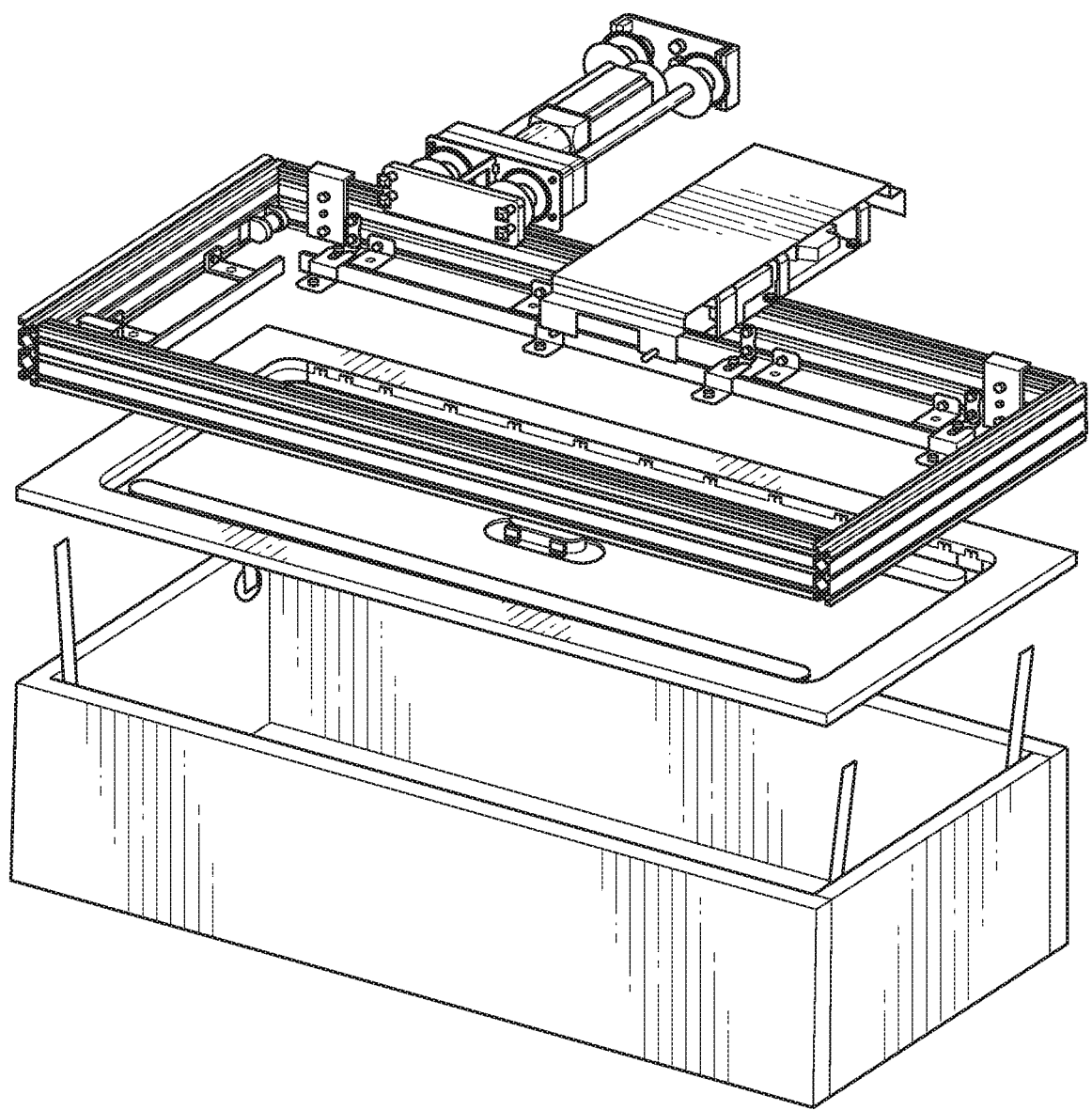
FIG. 13 illustrates exemplary sub-assemblies of an installation system for ease of installation of modular furniture according to various embodiments of the present technology.

FIG. 13 illustrates exemplary sub-assemblies of an installation system for ease of installation of modular furniture according to various embodiments of the present technology. FIG. 13 shows a chassis system, a drivetrain, and electronics module, a shroud and lights and sensor system, a payload (e.g., furniture), and webbing.

Figure 14:
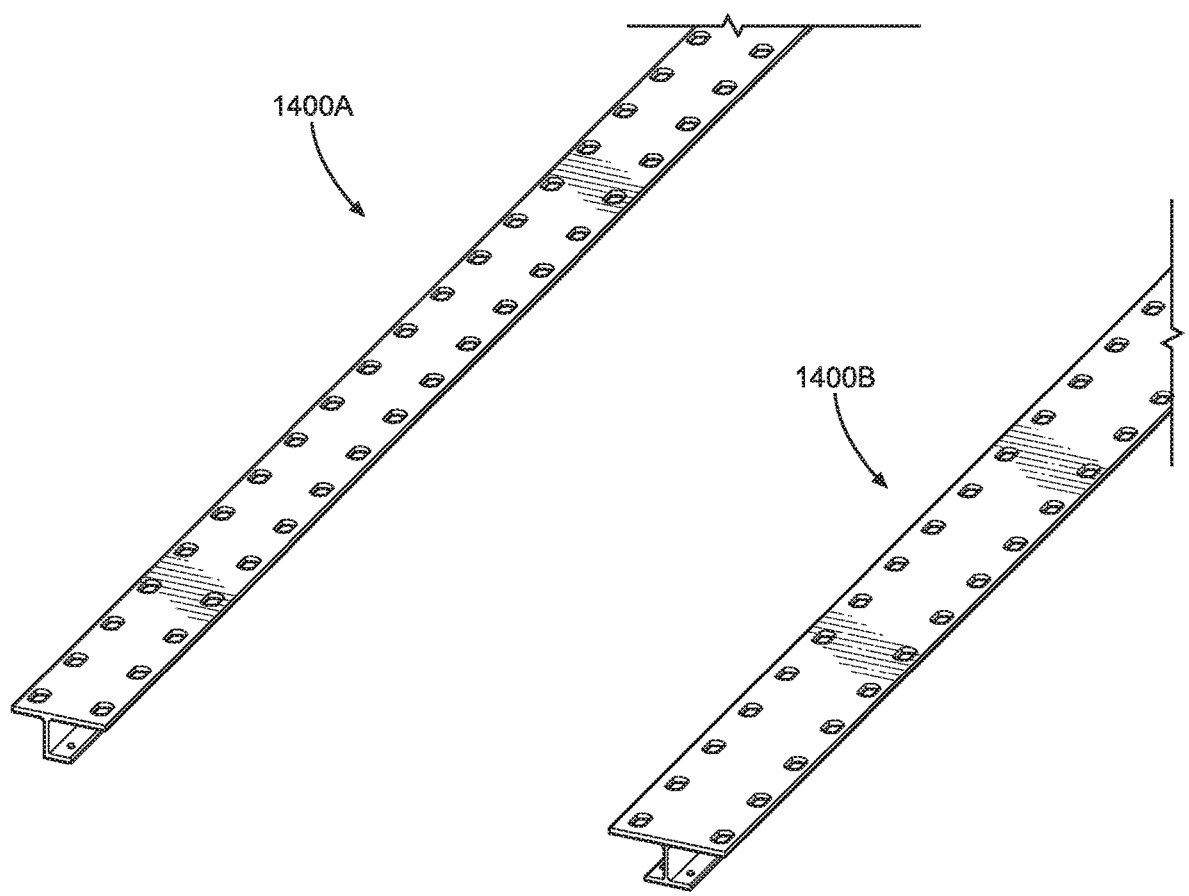
FIG. 14 illustrates ceiling rails for ease of installation of modular furniture according to various embodiments of the present technology.

FIG. 14 illustrates ceiling rails for ease of installation of modular furniture according to various embodiments of the present technology. FIG. 14 shows exemplary machined aluminum extrusion profiles including two sections, a first section for outside rails (i.e., J Profile 1400A), and a second section for inside rails (i.e., I Profile 1400B). The exemplary machined aluminum extrusion profiles (i.e., J Profile 1400A and I Profile 1400B), also include section detail accommodating of drill access in the top flange and loaded on the lower flange.

Figure 15:
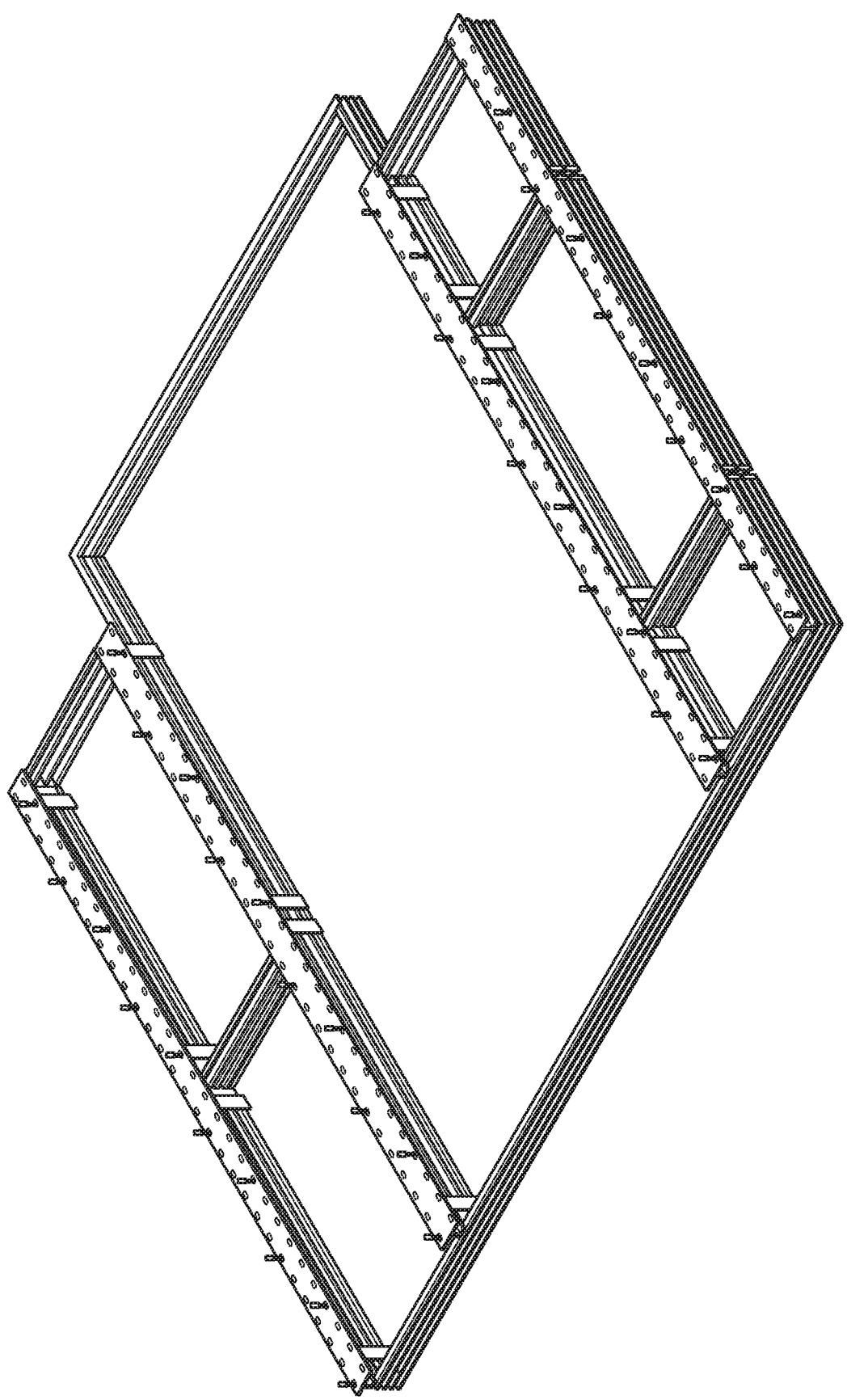
FIG. 15 illustrates a ceiling rail configuration for ease of installation of modular furniture according to various embodiments of the present technology.

FIG. 15 illustrates a ceiling rail configuration for ease of installation of modular furniture according to various embodiments of the present technology. The ceiling rail configuration may be used for a bed with storages on both sides of the bed. Furthermore, the ceiling rail configuration includes a staggered and distributed anchor arrangement.

Figure 16:
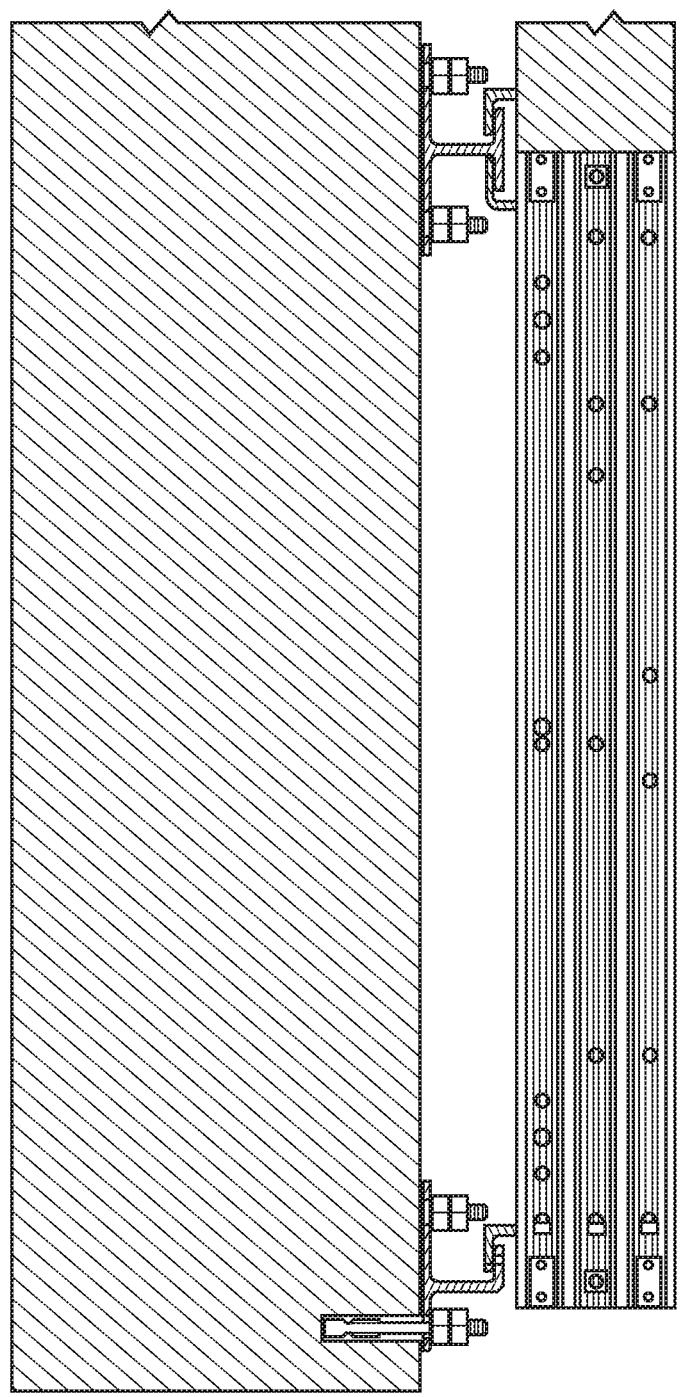
FIG. 16 illustrates a ceiling rail section and anchors according to various embodiments of the present technology.

FIG. 16 illustrates a ceiling rail section and anchors according to various embodiments of the present technology. FIG. 16 includes a robot chassis, robot hook attachment, and jam nuts. For instance, the jam nuts hold an exemplary anchor at a nominal depth into a concrete slab. The robot chassis is connected to the concrete slab using a robot hook attachment according to some embodiments.

Figure 17:
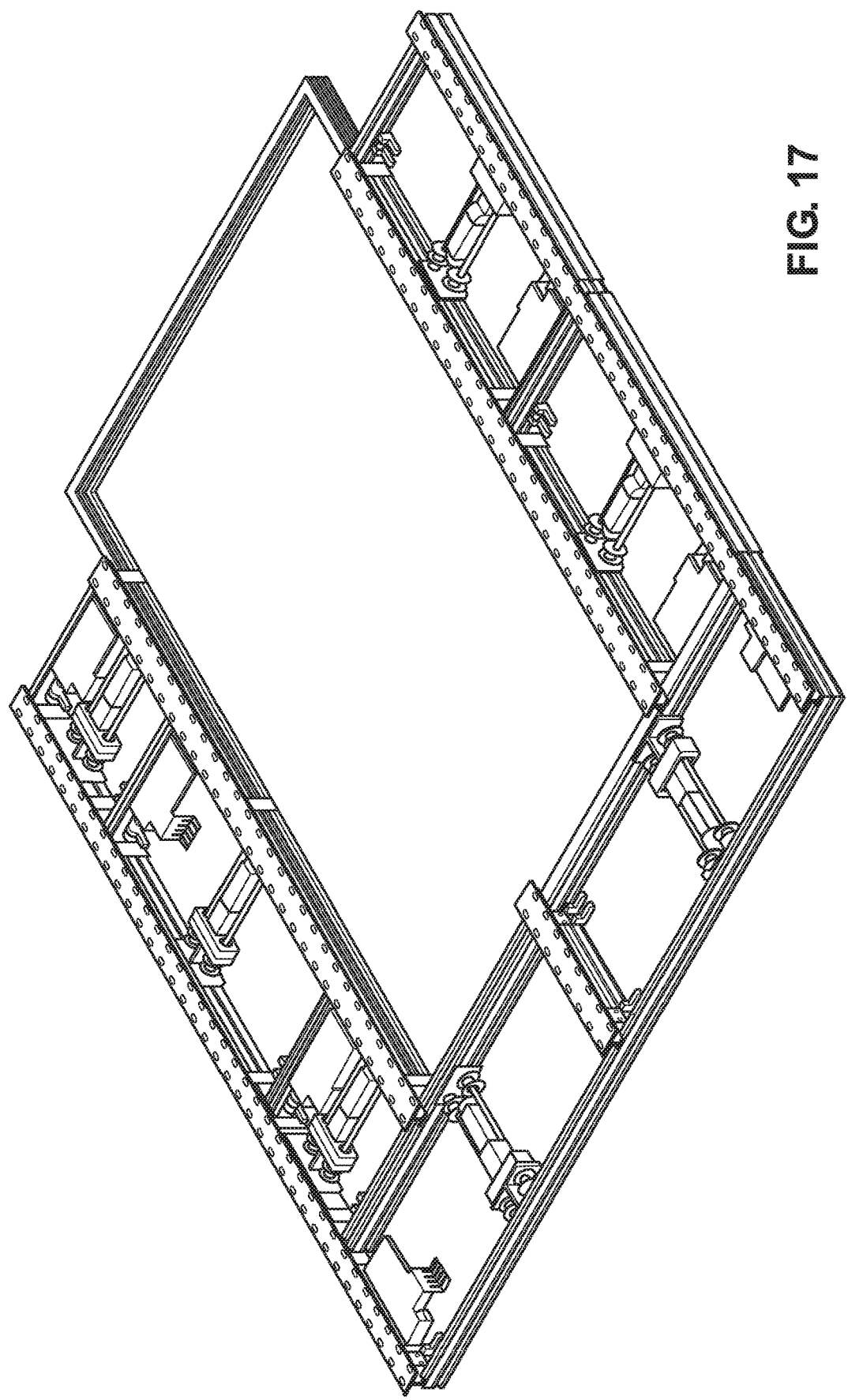
FIG. 17 illustrates a full layout of a rail configuration according to various embodiments of the present technology.

FIG. 17 illustrates a full layout of a rail configuration according to various embodiments of the present technology. The full layout of a rail configuration allows for maximum storage in various embodiments.

Figure 18:
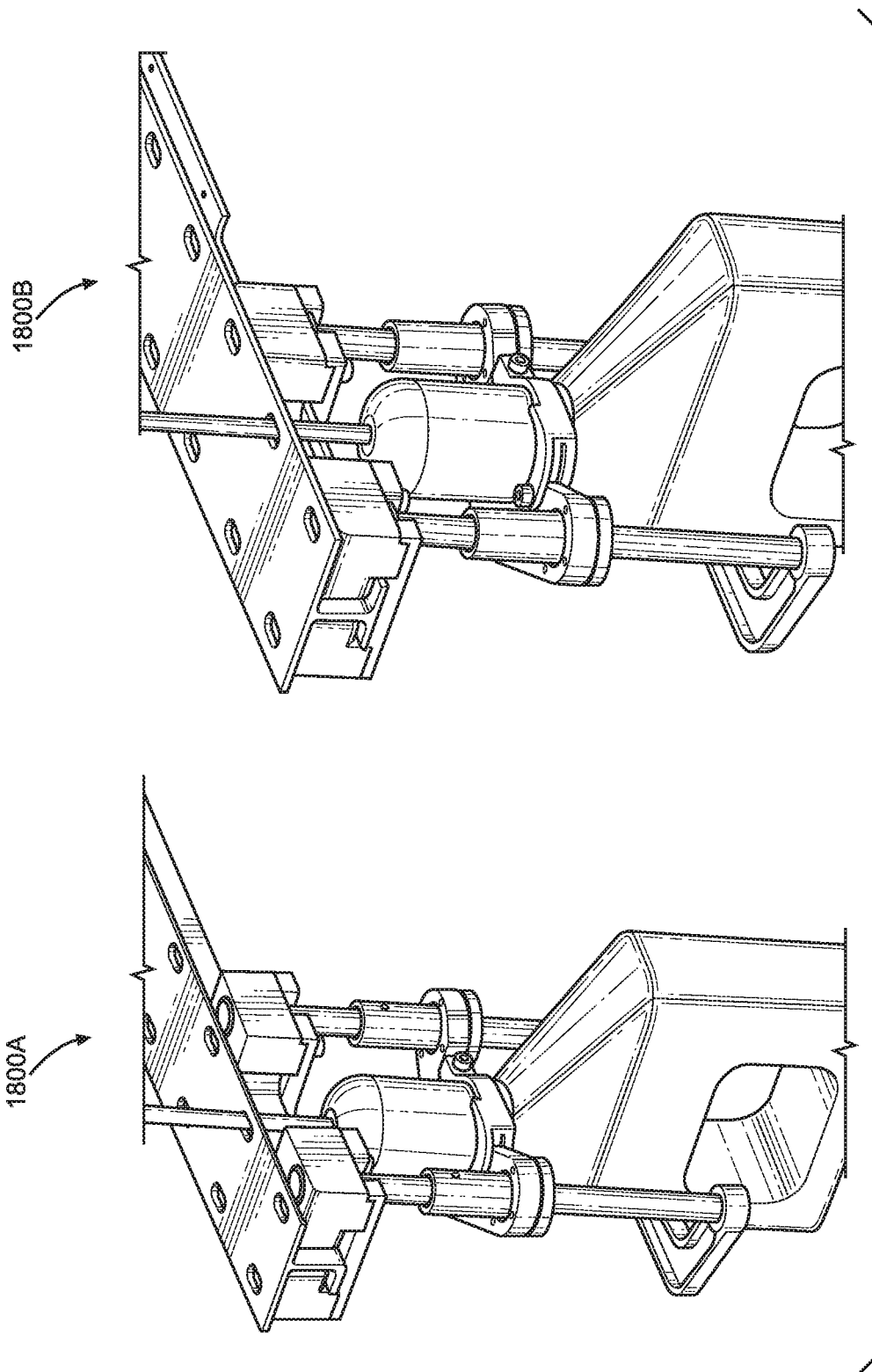
FIG. 18 illustrates an anchor and drill jig used for installation according to various embodiments of the present technology.

FIG. 18 illustrates an anchor and drill jig used for installation according to various embodiments of the present technology. In various instances the anchor and drill jig can be used for drilling multiple holes on a rail, while maintaining a tight tolerance on perpendicularity and center offset distance in the rail slot. The anchor and drill jig can be used with a replaceable adapter as shown to work with both inside rails (i.e., I Profile 1800B) and outside rails (i.e., J Profile 1800A).

Figure 19:
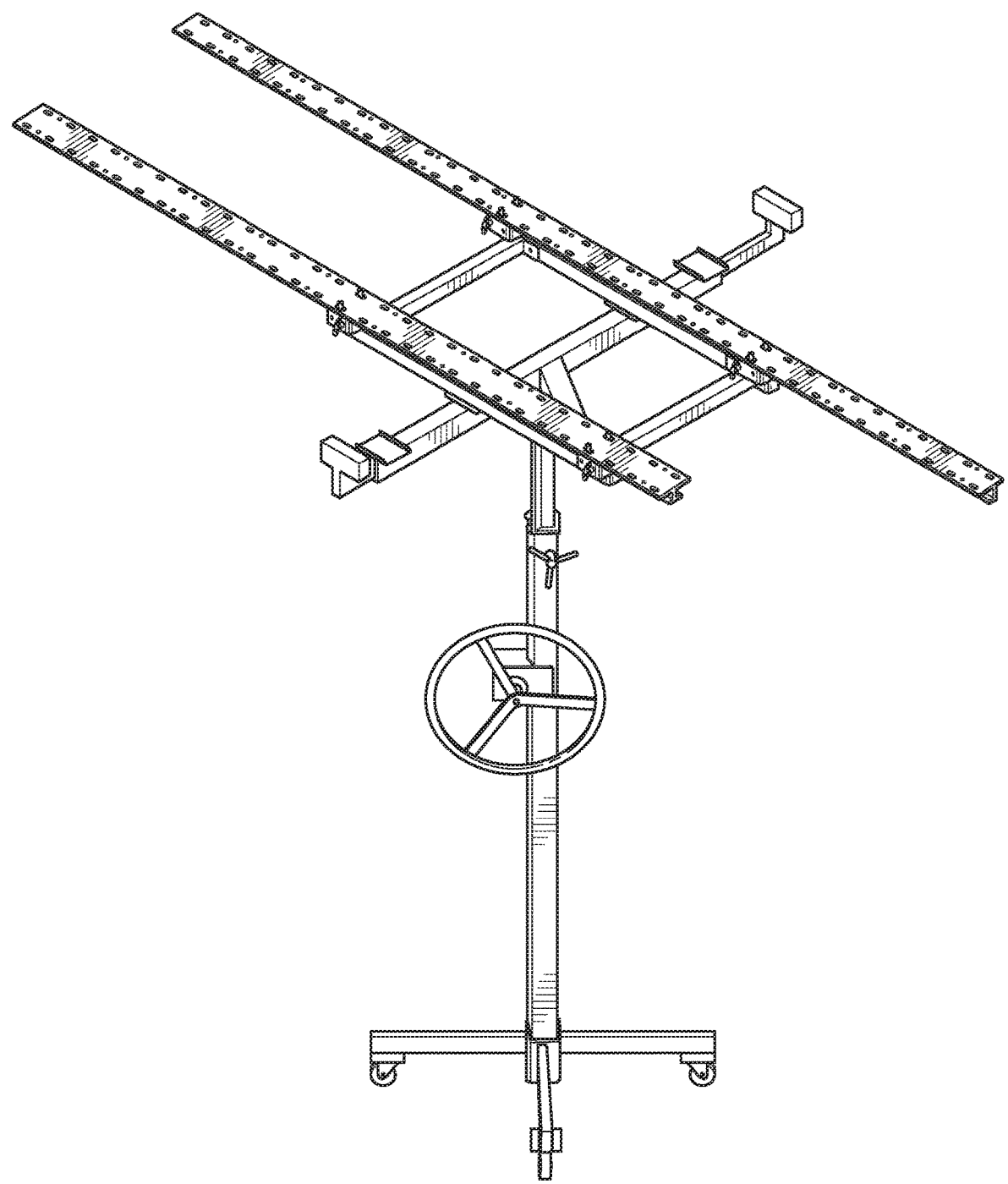
FIG. 19 illustrates a perspective view of a ceiling rail lift used for installation according to various embodiments of the present technology.

FIG. 19 illustrates a perspective view of a ceiling rail lift used for installation according to various embodiments of the present technology. The ceiling rail lift allows for simultaneous lifting of two adjacent rails (e.g., both inside rails (i.e., I Profile) and outside rails (i.e., J Profile)) in near perfect orientation as well as spacing. The ceiling rail lift further may reduce dependency on multiple installation crew as well as reducing fatigue of installation users.

Figure 20:
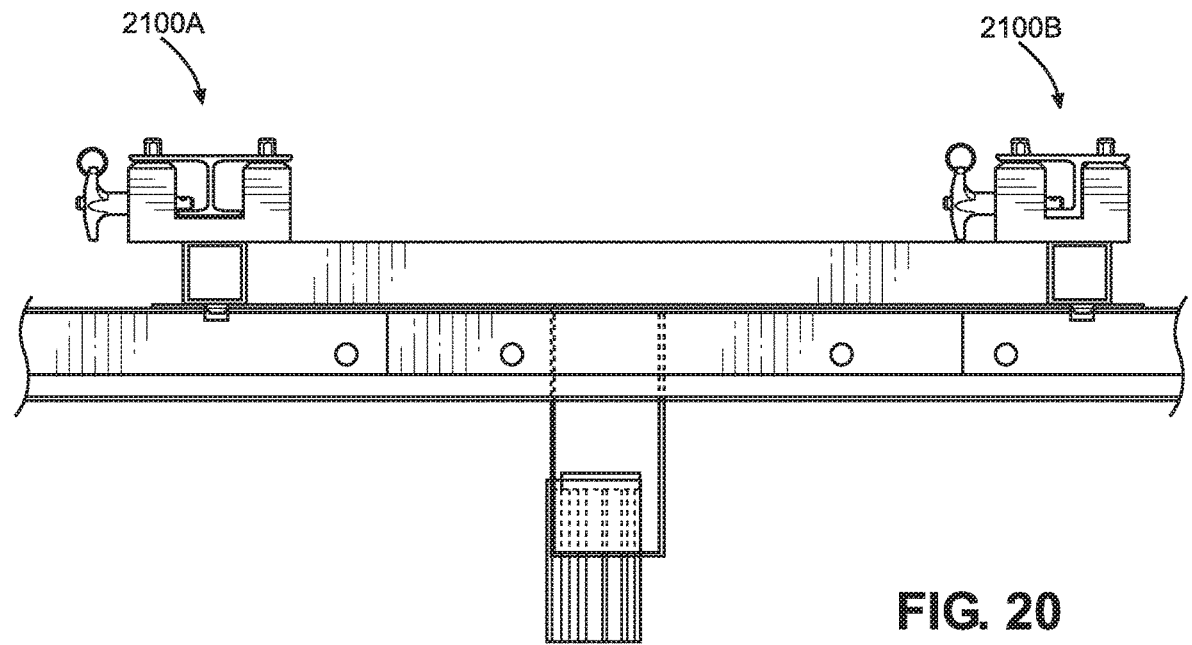
FIG. 20 illustrates a close-up of a ceiling rail lift used for installation according to various embodiments of the present technology.

FIG. 20 illustrates a close-up of a ceiling rail lift used for installation according to various embodiments of the present technology. FIG. 20 shows both inside rails (i.e., I Profile 2000A) and outside rails (i.e., J Profile 2000B).

Figure 21:
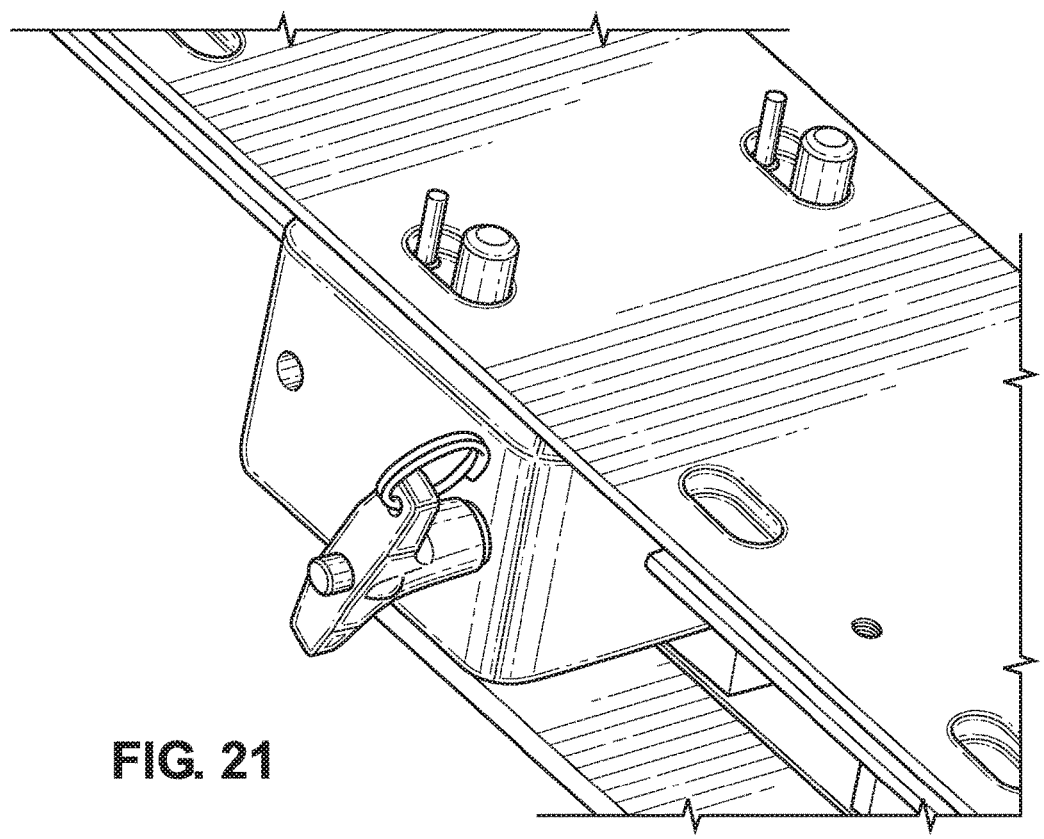
FIG. 21 illustrates another close-up of a ceiling rail lift used for installation according to various embodiments of the present technology.

FIG. 21 illustrates another close-up of a ceiling rail lift used for installation according to various embodiments of the present technology. FIG. 21 shows a latch to hold the rail, a rail holding block, spring loaded dowels and the rail for both inside rails (i.e., I Profile) and outside rails (i.e., J Profile).

Figure 22:
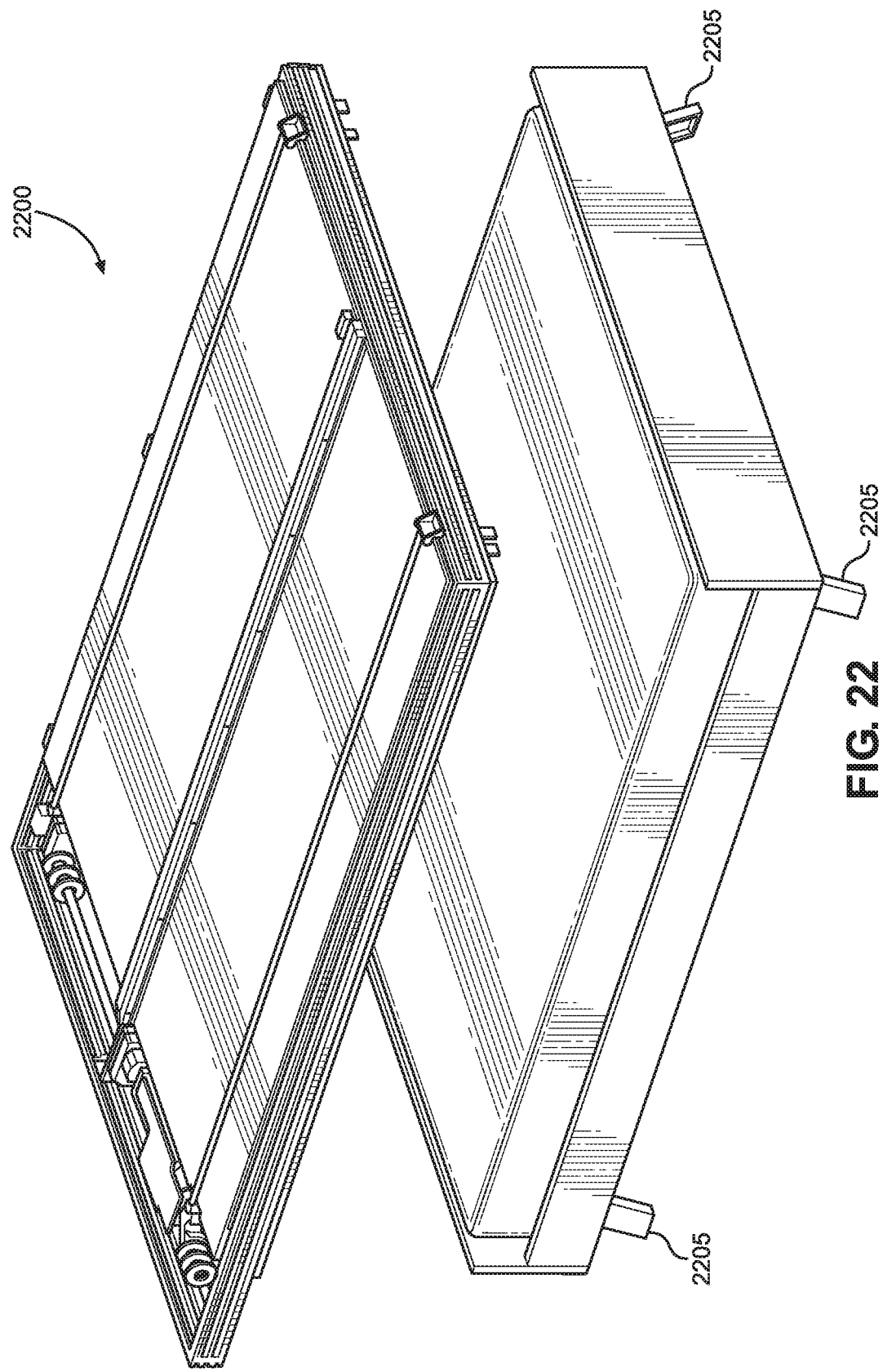
FIG. 22 is a drawing of retractable feet attached to modular furniture according to various embodiments of the present technology.

FIG. 22 is a drawing of retractable feet attached to modular furniture according to various embodiments of the present technology. In various embodiments the retractable feet provide support and height to modular furniture (e.g., a bed, a table, a couch) when the modular furniture is fully lowered to the floor by automatically deploying the retractable feet to variable height. Furthermore, the retractable feet may retract and be hidden automatically when the modular furniture is raised to the ceiling by leveraging linkage kinematics. In some instances, the retractable feet may operate passively without using of electronic actuators. The retractable feet allow the modular furniture to be strong and stable when resting on the retractable feet.

Figure 23:
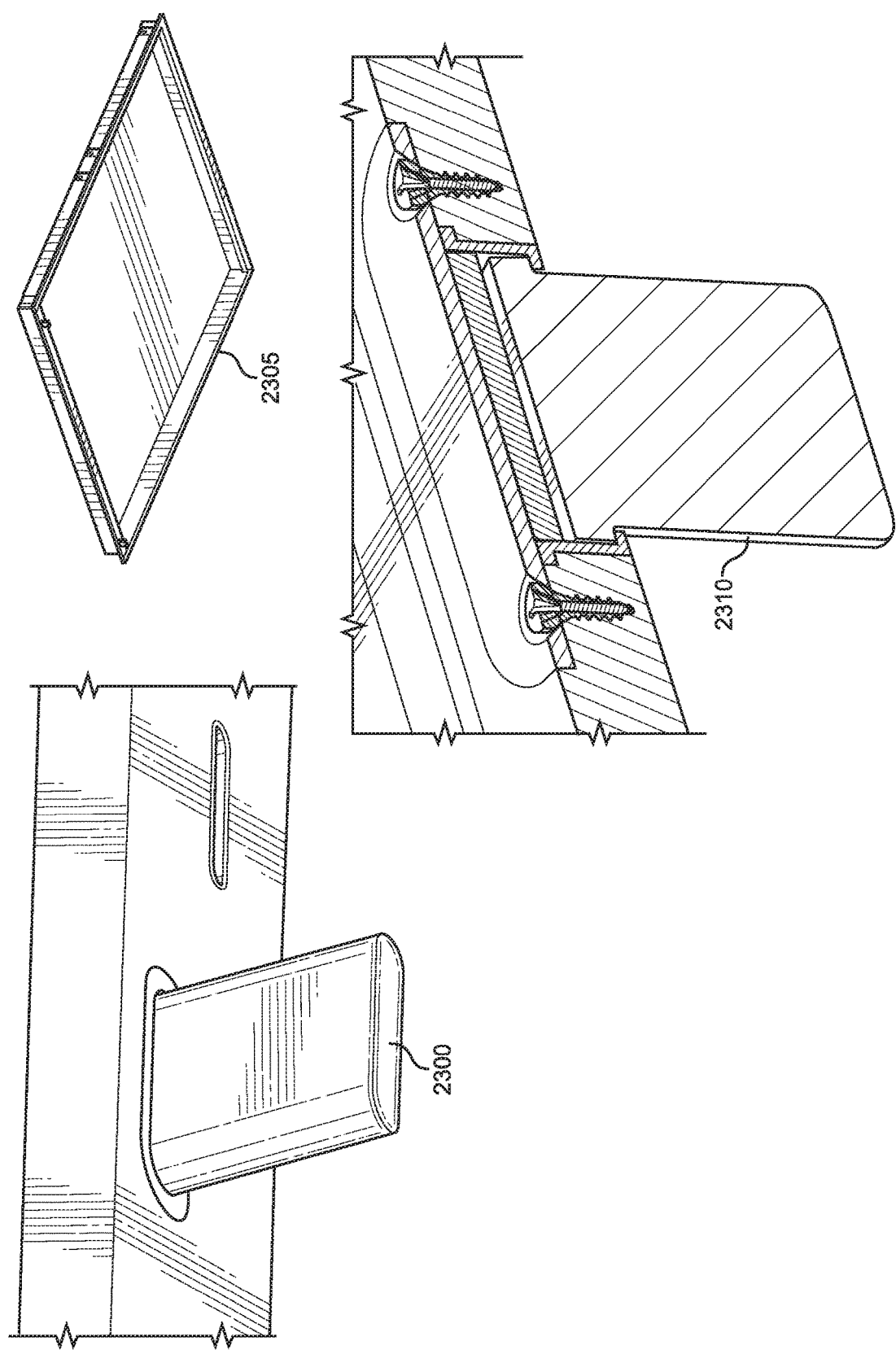
FIG. 23 is a close-up drawing of the system used for retractable feet attached to modular furniture according to various embodiments of the present technology.

FIG. 23 is a close-up drawing of the system used for retractable feet attached to modular furniture according to various embodiments of the present technology. FIG. 23 shows a close-up view of protruding ceiling lozenge assembly 2300 which interacts with a sliding lozenge on the modular furniture. FIG. 23 also shows a sub-assembly view of ceiling shroud system 2305 which incorporates a plurality of ceiling lozenge assemblies on corners of the modular furniture. FIG. 23 further shows a section view of a ceiling lozenge shroud sleeve 2310, a pre-load pad, and a locking plate. In various embodiments gaps and tolerances around a ceiling lozenge are designed to allow free vertical motion and limited tilt in the ceiling lozenge to self-align with swinging/misaligned furniture.

Turning now to FIG. 24 through FIG. 28 that show graphical user interfaces (GUIs) for the ease of installation application in various embodiments. Some embodiments shown in FIG. 24 through FIG. 28 are directed to a system of one or more computers which can be configured to perform particular operations or actions by virtue of having software, firmware, hardware, or a combination thereof installed on the system that in operation causes or cause the system to perform actions and/or method steps as described herein. The ease of installation application may be tab-based with each tab representing a step of the installation process. For example, a grid of units is shown on the right hand side of the GUI that an installer uses to perform the necessary calibration task on each unit individually by selecting the unit to be calibrated, which is highlighted in a white box in the GUIs shown in FIG. 24 through FIG. 28. Furthermore, global controls are shown at the bottom right of each of the GUIs including stopping all units (Stop control), homing the selected unit (i.e., raising slowly to find a home/origin location) (Home control), raising (Raise control), and lowering the selected unit at normal speed (Lower control). A safety system cameras and main IP address are displayed in a row at the top of the GUIs shown in FIG. 24 through FIG. 28.

Figure 24:
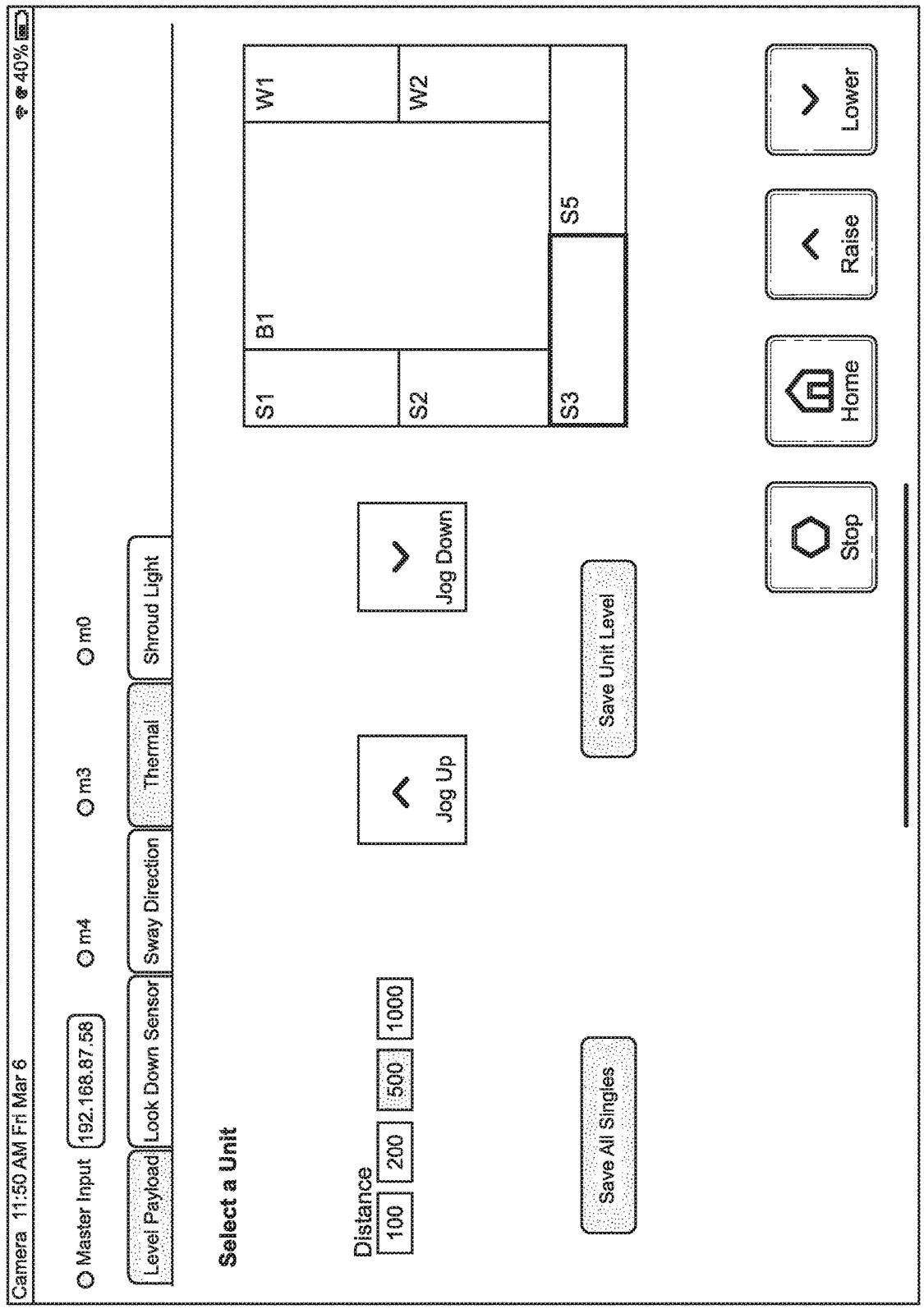
FIG. 24 illustrates a graphical user interface (GUI) of an ease of installation application including a level payload tab according to various embodiments of the present technology.

FIG. 24 illustrates a graphical user interface (GUI) of an ease of installation application including a level payload tab according to various embodiments of the present technology. In various embodiments the level payload tab is for the installer to determine and save the fully lowered position of each unit. For example, this fully lowered position is recorded in a database and configuration files in terms of the rotary position of the motor. In some embodiments, the fully lowered position of each unit may be a position determined using a Hall sensor, incremental or absolute encoder ticks, and calculated or measured motor revolutions.

Figure 25:
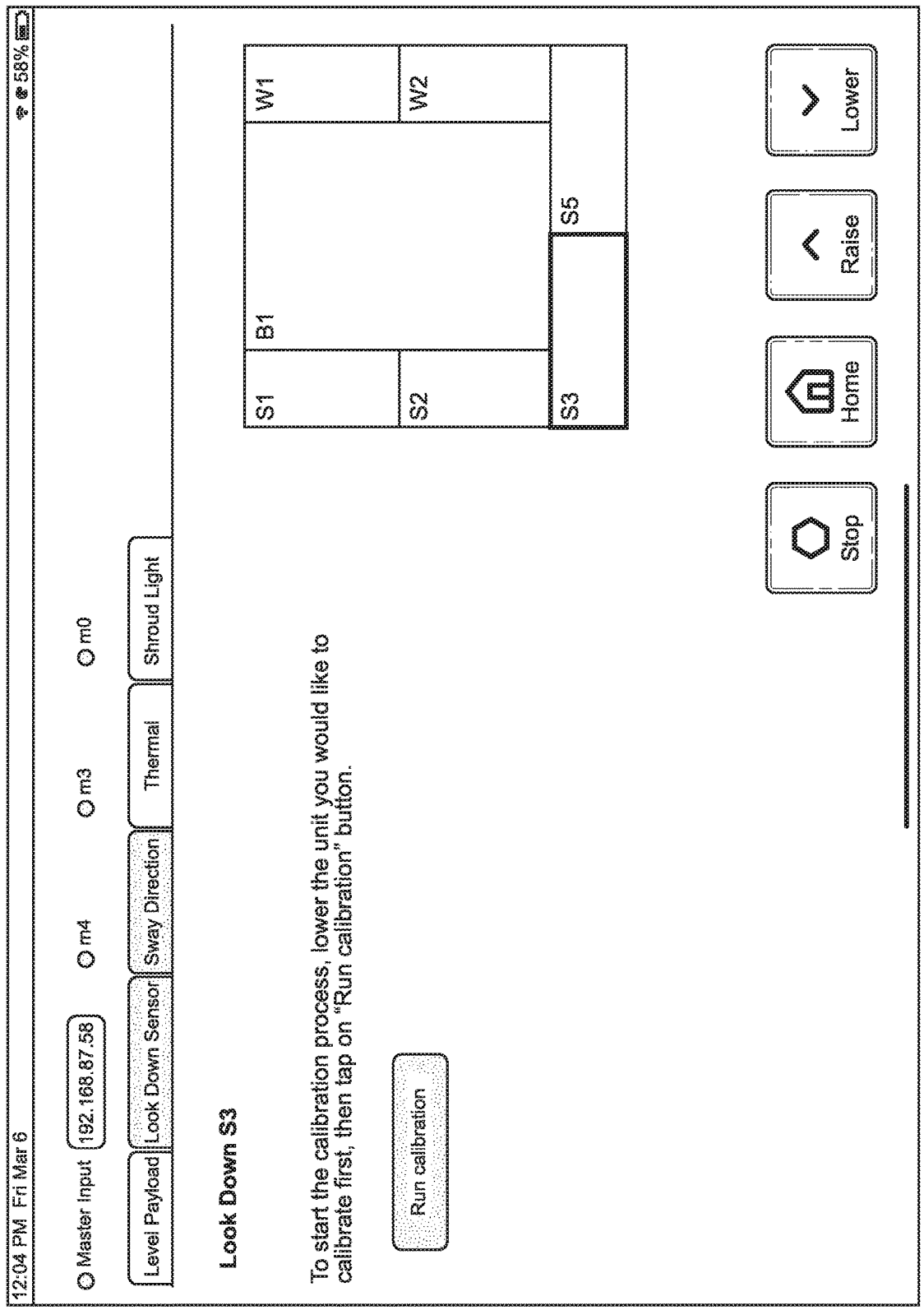
FIG. 25 illustrates a graphical user interface (GUI) of an ease of installation application including a look down sensor tab to calibrate sensors according to various embodiments of the present technology.

FIG. 25 illustrates a graphical user interface (GUI) of an ease of installation application including a look down sensor tab to calibrate sensors according to various embodiments of the present technology. A sensor (e.g., the look down sensor) in the shroud of each unit (except the bed) captures Red, Green, and Blue (RGB) and grayscale images of the inside of the unit located above (in various instances shrouds are located directly above their respective units). For example, the RGB images may be displayed to users in the ease of installation application so they can see the contents of their units, and the grayscale image may be used for a sway detection algorithm. For instance, the look down sensor tab is further used to verify and adjust the cropping of both the grayscale and RGB image. The installer may lower the selected unit, then press "run calibration" that causes the look down sensor to take a picture, and trigger an automated cropping process. Once the automated cropping is complete, the RGB image and grayscale image are displayed, and the installer may press "set points" to display red dots representing the output of the automated cropping. If the cropping is inaccurate, the installer may adjust it using the arrows and zoom-in/zoom-out functionality. Once the red dots are accurately on the corners of the unit for both the RGB image and the grayscale image, the installer presses "done" and moves on to the next unit.

Figure 26:
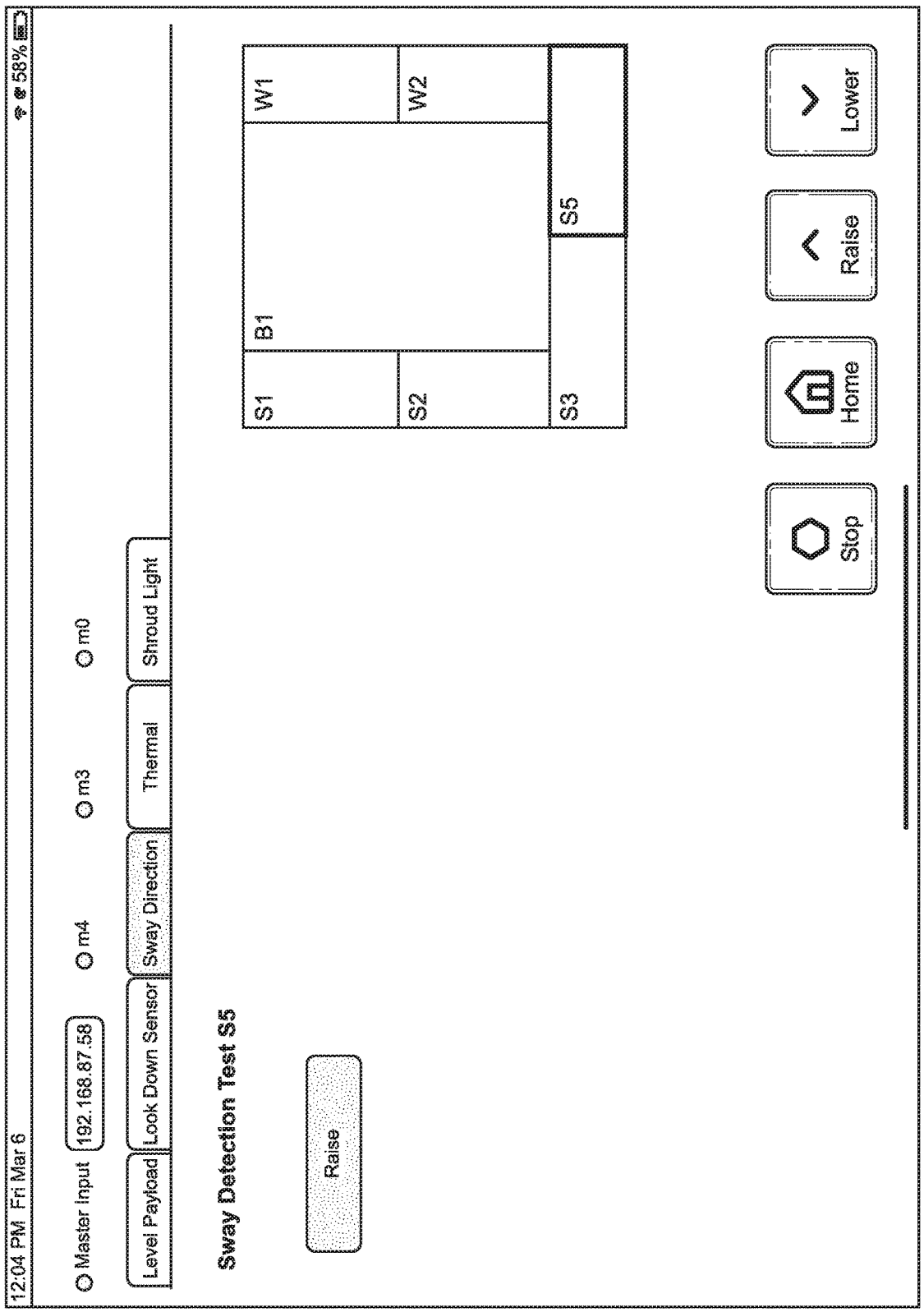
FIG. 26 illustrates a graphical user interface (GUI) of an ease of installation application including a sway detection tab according to various embodiments of the present technology.

FIG. 26 illustrates a graphical user interface (GUI) of an ease of installation application including a sway detection tab according to various embodiments of the present technology. In various embodiments the sway detection tab is for the installer to verify that sway detection is working correctly on each unit (e.g., no sway detection on the bed). For example, the installer may select a unit, displace the unit to the side slightly by force and press 'Raise', verifying that the unit raises slowly at the top of its ascent (i.e., signifying medium sway). The installer then may lower the unit again and displace the unit to the side with more force and press raise with the increased displacement until high sway detection is triggered (e.g., an alert will pop-up).

Figure 27:
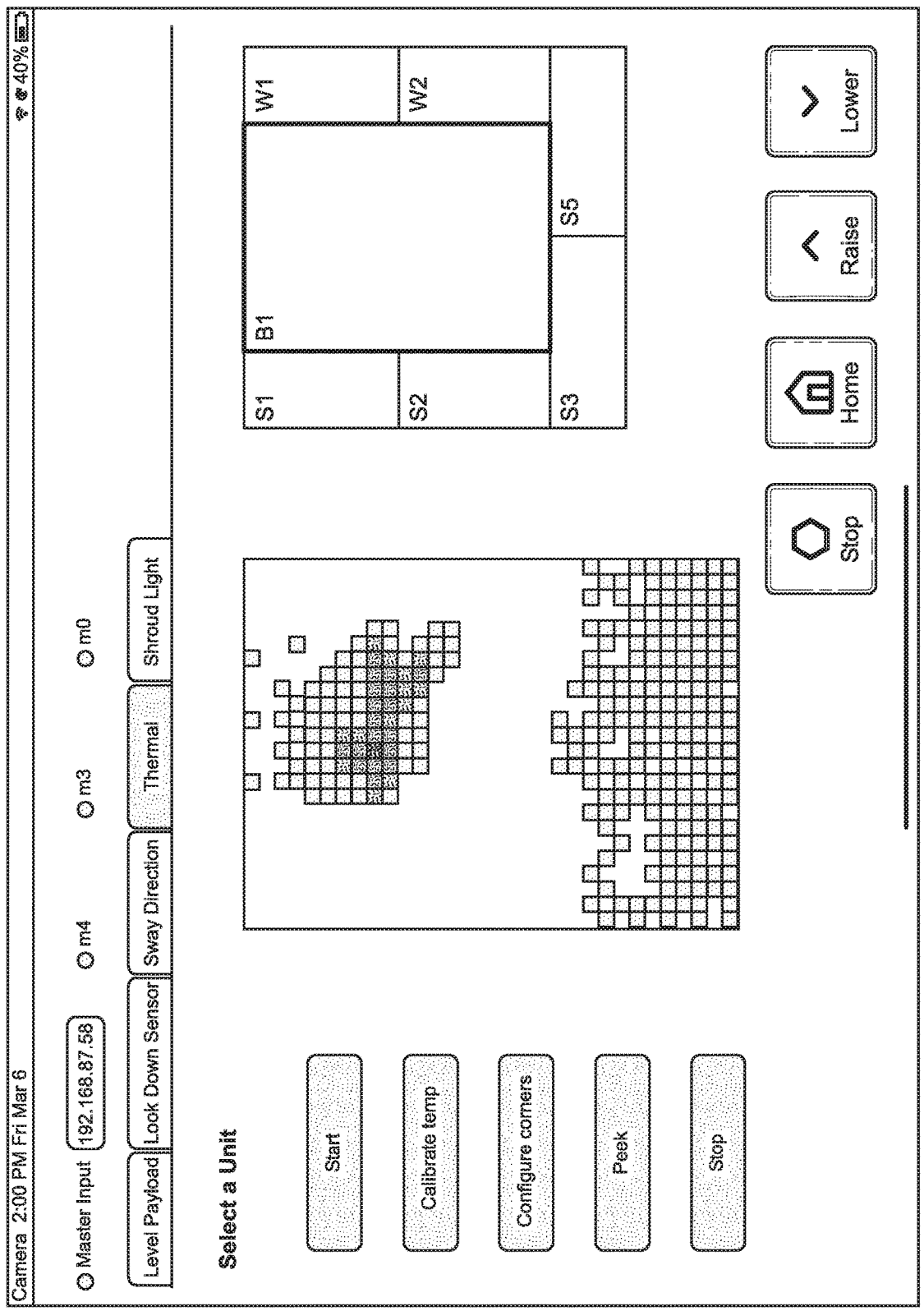
FIG. 27 illustrates a graphical user interface (GUI) of an ease of installation application including a thermal tab to calibrate thermal sensors according to various embodiments of the present technology.

FIG. 27 illustrates a graphical user interface (GUI) of an ease of installation application including a thermal tab to calibrate thermal sensors according to various embodiments of the present technology. In some embodiments, the thermal tab is used to calibrate a region of interest for the thermal sensor that is above the bed. For example, the installer presses 'Start' to start the thermal sensor. The 'Peek' button shows a snapshot from the thermal sensor in the rectangle in the center of the screen. The installer places four hot objects on the corners of the bed, and presses 'Peek' to verify that the sensor is detecting the objects. The installer may press 'Configure Corners' to save the location of the corners of the bed allowing the sensor to run more efficiently and reduce false positives by ignoring areas in its field of view that are outside of the bed frame. When done, the installer presses 'Stop' to stop the thermal sensor.

Figure 28:
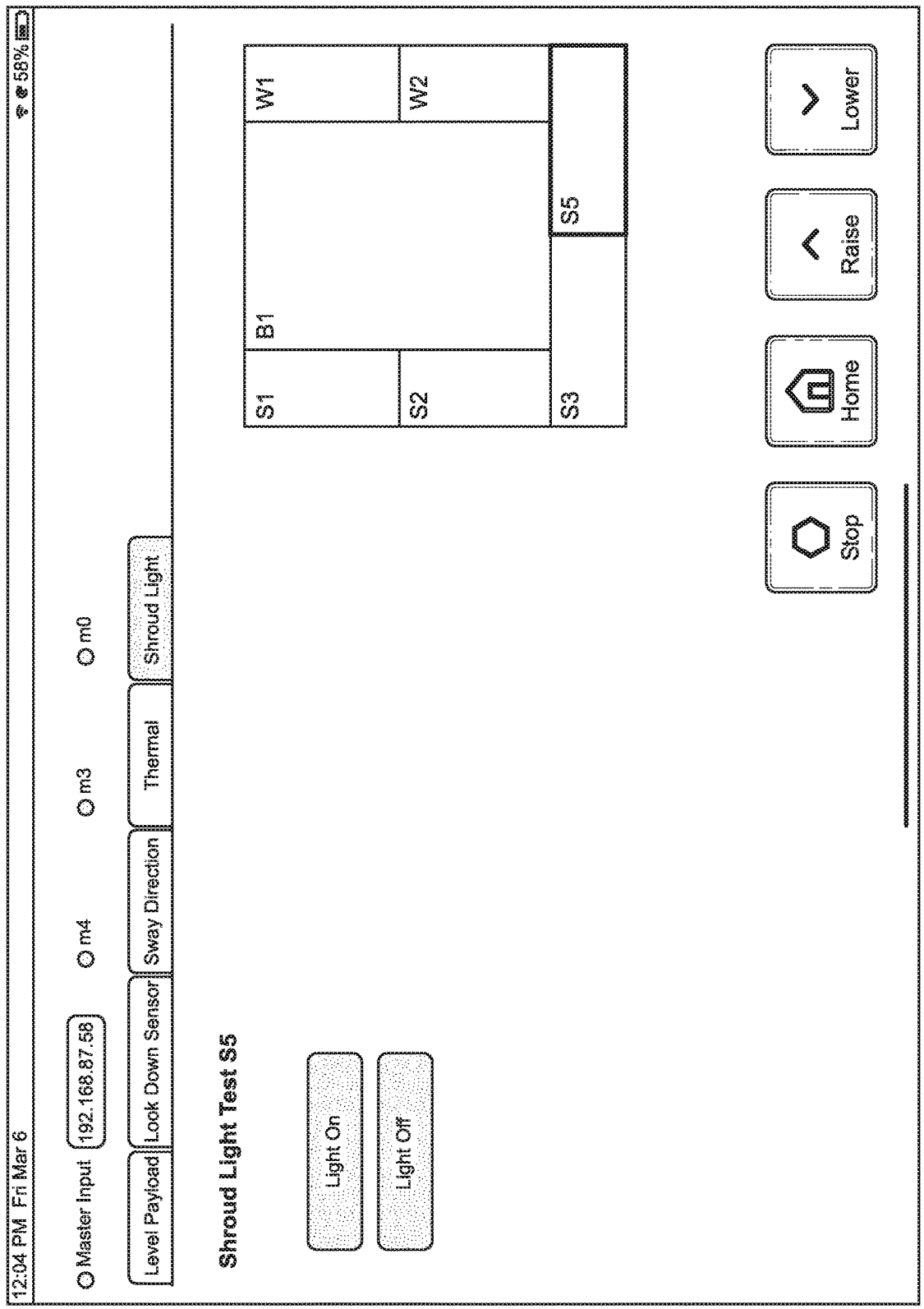
FIG. 28 illustrates a graphical user interface (GUI) of an ease of installation application including a shroud light tab to verify a should light according to various embodiments of the present technology.

FIG. 28 illustrates a graphical user interface (GUI) of an ease of installation application including a shroud light tab to verify a should light according to various embodiments of the present technology. In some embodiments, the 'Shroud Light' tab is used to verify that the shroud light above each unit is operating properly. For example, the installer lowers the selected unit, and verifies that 'Light On' and 'Light Off' work correctly.

Figure 29:
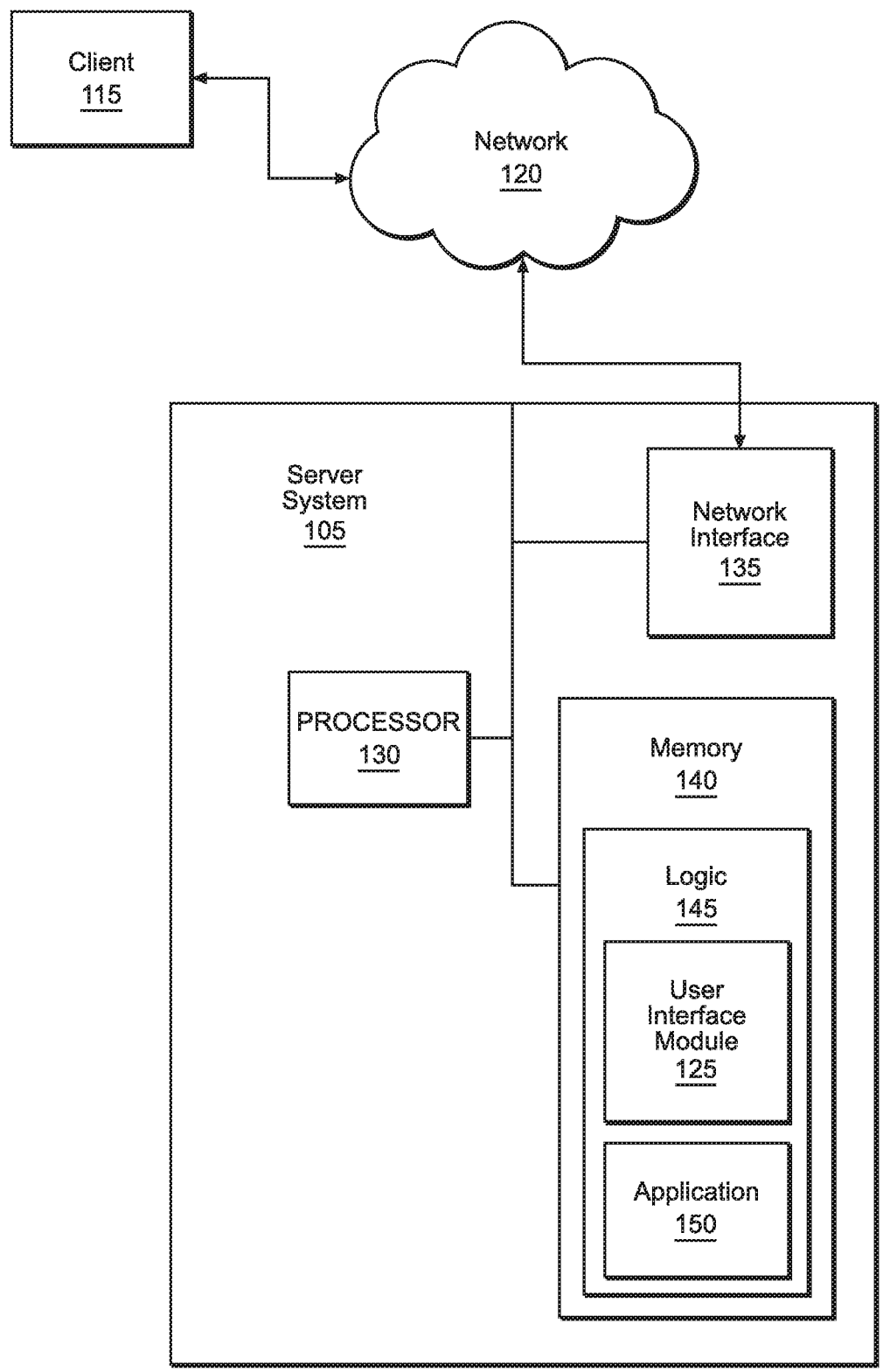
FIG. 29 illustrates a schematic diagram of an exemplary computing architecture that can be used to practice embodiments of the present technology.

FIG. 29 illustrates a schematic diagram of an exemplary computing architecture that can be used to practice embodiments of the present technology. The architecture comprises a server system, hereinafter "system 105" that is configured to provide various functionalities, which are described in greater detail throughout this document. Generally, the system 105 is configured to communicate with client devices, such as client 115. The client 115 may include, for example, a sensor system (e.g. look down sensor, sway detection sensor, thermal sensor, and/or a light sensor) or other similar computing device. An example of a computing device that can be utilized in accordance with the present technology is described in greater detail with respect to FIG. 30.

The system 105 may communicatively couple with the client 115 via a public or private network, such as network 120. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 120 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The system 105 generally comprises a processor, 130, a network interface 135, and a memory 140. According to some embodiments, the memory 140 comprises logic (e.g., instructions) 145 that can be executed by the processor 130 to perform various methods. For example, the logic may include a user interface module 125 as well as a data aggregation and correlation application (hereinafter application 150) that is configured to provide the functionalities described in greater detail herein including easy installation of modular furniture. In some instances, application 150 is the ease of installation application. In various instances, the user interface module 125 enables a customizable interface and/or graphical user interfaces (GUIs) shown in FIG. 24 through FIG. 28.

It will be understood that the functionalities described herein, which are attributed to the system 105 and application 150 may also be executed within the client 115. That is, the client 115 may be programmed to execute the functionalities described herein. In other instances, the system 105 and client 115 may cooperate to provide the functionalities described herein, such that the client 115 is provided with a client-side application that interacts with the system 105 such that the system 105 and client 115 operate in a client/server relationship. Complex computational features may be executed by the server 105, while simple operations that require fewer computational resources may be executed by the client 115, such as data gathering and data display.

In general, the user interface module 125 may be executed by the system 105 to provide various graphical user interfaces (GUIs) that allow users to interact with the system 105. In some instances, GUIs (e.g., GUIs shown in in FIG. 24 through FIG. 28) are generated by execution of the application 150 itself. Users (e.g., an installation user) may interact with the system 105 using, for example, a client 115. The system 105 may generate web-based interfaces for the client.

Figure 30:
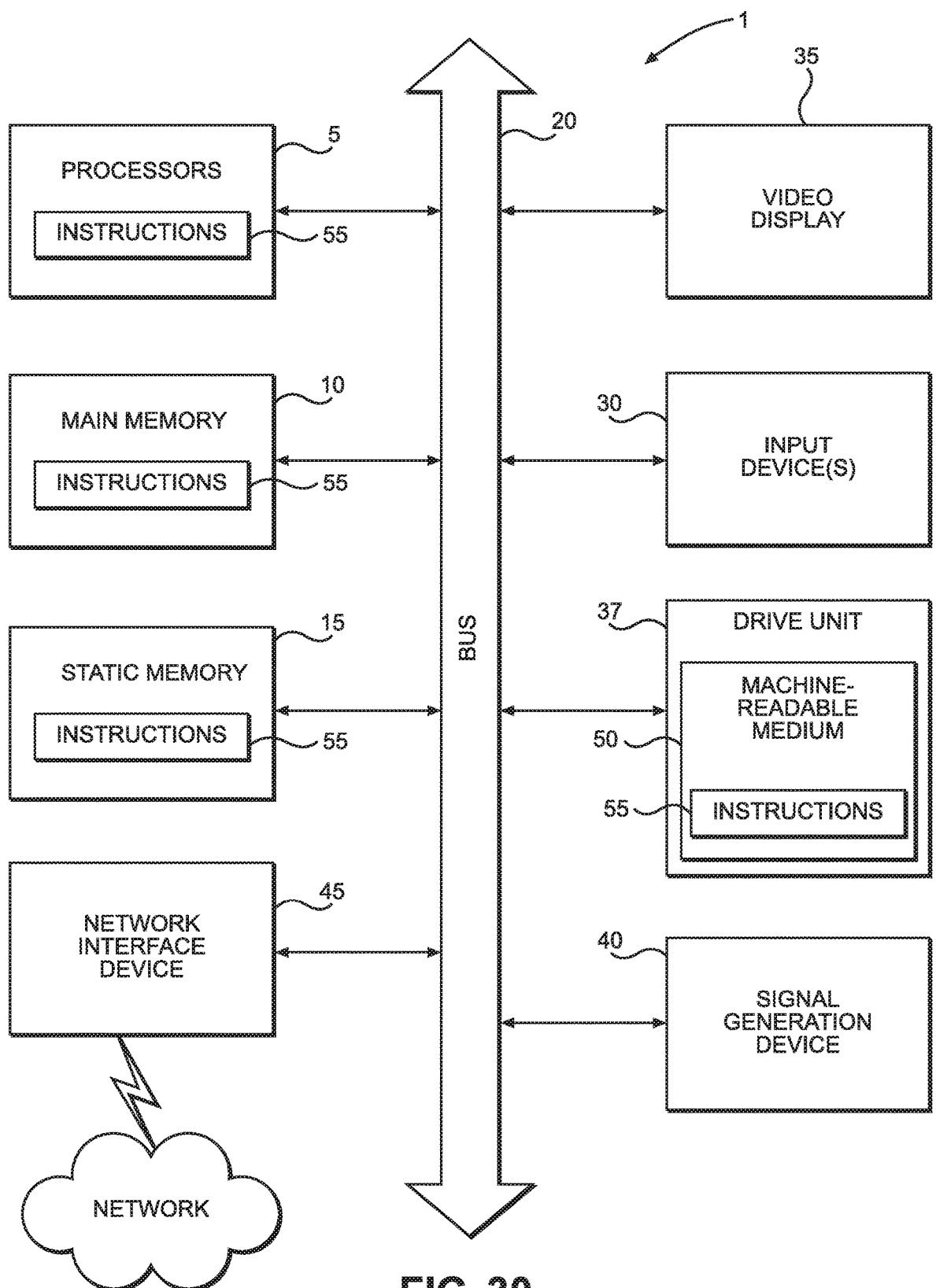
FIG. 30 illustrates a computer system according to exemplary embodiments of the present technology.

FIG. 30 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 120, see FIG. 29) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiments in many different forms, there is shown in the drawings and has been described in detail several specific embodiments with the understanding that the present disclosure is to be considered as an exemplification of the principles of the technology and is not intended to limit the technology to the embodiments illustrated.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three-dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below", or "beneath" other elements would then be oriented "above" the other elements. Therefore, the example terms "below" and "lower" can, therefore, encompass both an orientation of above and below.

The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for ease of installation of modular furniture, the method comprising:
   receiving a ceiling scan;
   mounting a rails system based on the ceiling scan;
   installing robots for machine control of the modular furniture using the rails system; and
   positioning the modular furniture using a positioning control system electrically connected to the robots.

2. The method as recited in claim 1, wherein the mounting the rails system based on the ceiling scan comprises installing anchors.

3. The method as recited in claim 2, wherein the modular furniture comprises retractable feet.

4. The method as recited in claim 3, wherein the modular furniture comprises a bed.

5. The method as recited in claim 1, wherein the rails system comprises a robot chassis.

6. The method as recited in claim 1, wherein the mounting the rails system based on the ceiling scan comprises using a ceiling rail lift, the ceiling rail lift allowing simultaneous lifting of two or more adjacent rails of the rails system.

7. The method as recited in claim 6, wherein the ceiling rail lift allowing simultaneous lifting of two or more adjacent rails of the rails system comprises a first section for outside rails including a J Profile rail, and a second section for inside rails including an I Profile rail.

8. The method as recited in claim 6, wherein the ceiling rail lift allowing simultaneous lifting of two or more adjacent rails of the rails system comprises a spring-loaded dowel, a rail holding block, and a latch.

9. The method as recited in claim 1, wherein the positioning control system electrically connected to the robots uses data received from a plurality of sensors for the positioning of the modular furniture.

10. The method as recited in claim 9, wherein the plurality of sensors include a sway detection sensor and a thermal sensor.

11. The method as recited in claim 1, wherein the positioning control system electrically connected to the robots comprises:
    at least one processor; and
    a memory storing processor-executable instructions, wherein the at least one processor is configured to implement the following operations upon executing the processor-executable instructions:
    determining a fully lowered position of the modular furniture;
    calibrating sensors to determine the fully lowered position of the modular furniture; and
    verifying sway detection of the modular furniture in the fully lowered position.

12. The method as recited in claim 11, wherein the at least one processor is further configured to implement the following operations upon executing the processor-executable instructions:
    wherein the calibrating sensors to determine the fully lowered position of the modular furniture comprise the following operations:
    receiving an image of the modular furniture;
    automatically cropping of the image of the modular furniture; and
    generating setpoints on the image of the modular furniture to verify the automatically cropping.

13. The method as recited in claim 11, wherein the at least one processor is further configured to implement the following operations upon executing the processor-executable instructions:
wherein the verify sway detection of the modular furniture in the fully lowered position comprises:
measuring a sway of the modular furniture;
comparing the sway of the modular furniture to a displacement threshold; and
generating an alert if the sway of the modular furniture exceeds the displacement threshold.

14. The method as recited in claim 11, wherein the at least one processor is further configured to implement the following operations upon executing the processor-executable instructions:
measuring a thermal level of the modular furniture using a thermal sensor;
comparing the thermal level of the modular furniture to a heat threshold; and
generating an alert if the thermal level of the modular furniture exceeds the heat threshold.

15. A method for ease of installation of modular furniture, the method comprising:
receiving a ceiling scan;
mounting a rails system based on the ceiling scan;
wherein the mounting the rails system based on the ceiling scan comprises using a ceiling rail lift, the ceiling rail lift allowing simultaneous lifting of two or more adjacent rails of the rails system;
installing robots for machine control of the modular furniture using the rails system; and
positioning the modular furniture using a positioning control system electrically connected to the robots.

16. The method as recited in claim 15, wherein the robots for machine control of the modular furniture using the rails system uses a drivetrain.

17. The method as recited in claim 15, wherein the modular furniture comprises a bed with storage boxes.

18. The method as recited in claim 15, wherein the modular furniture comprises a desk.

19. The method as recited in claim 15, wherein the modular furniture comprises a table.

20. A non-transitory computer readable medium having embodied thereon instructions being executable by at least one processor to perform the following operations for ease of installation of modular furniture:
receiving a ceiling scan;
mounting a rails system based on the ceiling scan;
installing robots for machine control of the modular furniture using the rails system; and
positioning the modular furniture using a positioning control system electrically connected to the robots.

* * * * *